United States Patent
Shimazawa et al.

(10) Patent No.: US 8,248,897 B2
(45) Date of Patent: Aug. 21, 2012

(54) METHOD FOR MANUFACTURING THERMALLY-ASSISTED MAGNETIC RECORDING HEAD COMPRISING LIGHT SOURCE UNIT AND SLIDER

(75) Inventors: Koji Shimazawa, Tokyo (JP); Yoshihiro Tsuchiya, Tokyo (JP); Seiichi Takayama, Tokyo (JP); Nobuyuki Mori, Tokyo (JP); Yasuhiro Ito, Tokyo (JP); Kosuke Tanaka, Tokyo (JP); Osamu Shindo, Tokyo (JP); Ryuji Fujii, Hong Kong (CN); Takashi Honda, Hong Kong (CN); Yoshitaka Sasaki, Milpitas, CA (US)

(73) Assignees: TDK Corporation, Tokyo (JP); Headway Technologies, Inc., Milpitas, CA (US)

( * ) Notice: Subject to any disclaimer, the term of this patent is extended or adjusted under 35 U.S.C. 154(b) by 182 days.

(21) Appl. No.: 12/899,101

(22) Filed: Oct. 6, 2010

(65) Prior Publication Data
US 2011/0228650 A1    Sep. 22, 2011

Related U.S. Application Data

(63) Continuation-in-part of application No. 12/726,981, filed on Mar. 18, 2010.

(51) Int. Cl.
*G11B 11/00* (2006.01)
(52) U.S. Cl. .................. 369/13.33; 369/112.27; 360/59
(58) Field of Classification Search ............... 369/13.33, 369/13.32, 13.24, 13.14, 13.03, 13.02, 13.12, 369/112.27, 112.29, 13.35; 360/59, 313, 360/125.31, 125.74
See application file for complete search history.

(56) References Cited

U.S. PATENT DOCUMENTS

| | | | |
|---|---|---|---|
| 5,481,082 A | 1/1996 | Yamamoto | |
| 7,538,978 B2 | 5/2009 | Sato et al. | |
| 7,804,655 B2 | 9/2010 | Shimazawa et al. | |
| 8,149,653 B2 * | 4/2012 | Shimazawa et al. | 369/13.33 |
| 2005/0213436 A1 | 9/2005 | Ono et al. | |
| 2008/0043360 A1 | 2/2008 | Shimazawa et al. | |
| 2008/0056073 A1 | 3/2008 | Shimizu | |
| 2009/0052078 A1 | 2/2009 | Tanaka et al. | |

(Continued)

FOREIGN PATENT DOCUMENTS
JP    A-2009-301597    12/2009

OTHER PUBLICATIONS

Oct. 17, 2011 Office Action issued in U.S. Appl. No. 12/728,510.

(Continued)

*Primary Examiner* — Ali Neyzari
(74) *Attorney, Agent, or Firm* — Oliff & Berridge, PLC

(57) ABSTRACT

A method for manufacturing a thermally-assisted magnetic recording head is provided, in which a light source unit including a light source and a slider including an optical system are bonded. A unit substrate is made of a material transmitting light having a predetermined wavelength, and a unit adhesion material layer that contains Sn, Sn alloy, Pb alloy or Bi alloy is formed on the light source unit and/or the slider. The manufacturing method includes: aligning the light source unit and the slider in such a way that a light from the light source can enter the optical system and the unit adhesion material layer is sandwiched therebetween; and causing a light including the predetermined wavelength to enter the unit substrate to melt the unit adhesion material layer. The unit adhesion material layer melted by the light including the predetermined wavelength can ensure high alignment accuracy as well as higher bonding strength and less change with time.

19 Claims, 9 Drawing Sheets

U.S. PATENT DOCUMENTS

2011/0228649 A1* 9/2011 Shimazawa et al. ....... 369/13.24
2011/0228650 A1 9/2011 Shimazawa et al.
2011/0242697 A1 10/2011 Mori et al.

OTHER PUBLICATIONS

U.S. Appl. No. 12/728,510, filed Mar. 22, 2010 in the name of Shimazawa et al.

U.S. Appl. No. 12/628,761, filed Dec. 1, 2009 in the name of Shimazawa et al.

Mar. 6, 2012 Office Action issued in U.S. Appl. No. 12/726,981.

Rottmayer, Robert et al., "Heat-Assisted Magnetic Recording," *IEEE Transactions on Magnetics*, Oct. 2, 2006, pp. 2417-2421, vol. 42—No. 10.

* cited by examiner

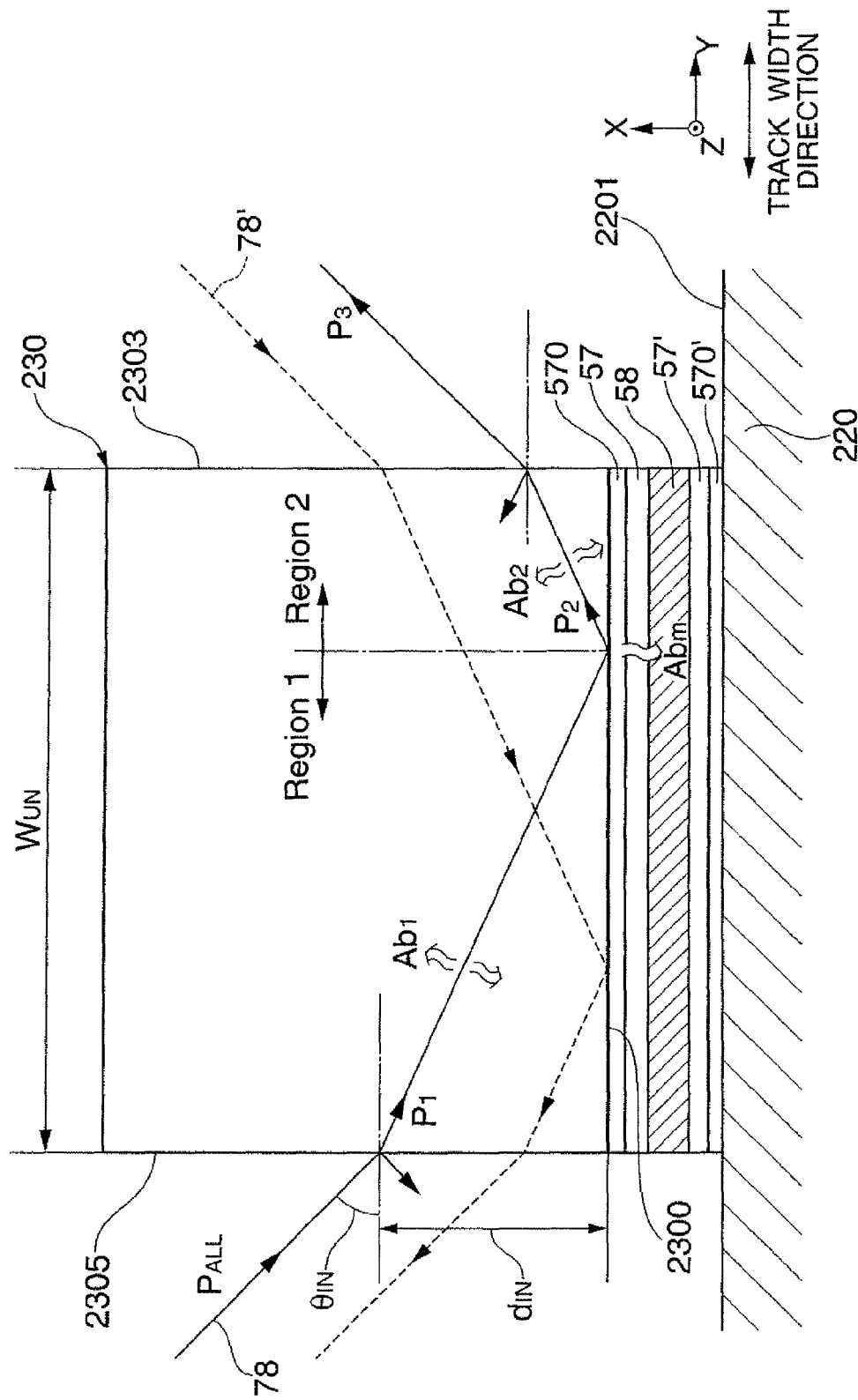

METHOD FOR MANUFACTURING THERMALLY-ASSISTED MAGNETIC RECORDING HEAD COMPRISING LIGHT SOURCE UNIT AND SLIDER

CROSS-REFERENCE TO RELATED APPLICATION

This application is a continuation-in-part application of U.S. application Ser. No. 12/726,981, filed on Mar. 18, 2010, now pending.

BACKGROUND OF THE INVENTION

1. Field of the Invention

The present invention relates to a thermally-assisted magnetic recording head constituted by joining a light source unit including a light source that emits light for performing thermally-assisted magnetic recording and a slider, and relates to a method for manufacturing the thermally-assisted magnetic recording head.

2. Description of the Related Art

As the recording densities of magnetic recording apparatuses become higher, as represented by magnetic disk apparatuses, further improvement has been required in the performance of thin-film magnetic heads and magnetic recording media. The magnetic recording medium is generally a kind of discontinuous body of magnetic grains gathered together, and each of the magnetic grains has an almost single magnetic domain structure. Here, one record bit consists of a plurality of the magnetic grains. Therefore, in order to improve the recording density, it is necessary to decrease the size of the magnetic grains and reduce irregularity in the boundary of the record bit. However, the decrease in size of the magnetic grains raises a problem of degradation in thermal stability of the magnetization due to the decrease in volume.

As a measure against the thermal stability problem, it may be possible to increase the magnetic anisotropy energy $K_U$ of the magnetic grains. However, the increase in energy $K_U$ causes the increase in anisotropic magnetic field (coercive force) of the magnetic recording medium. Whereas, the intensity of write field generated from the thin-film magnetic head is limited almost by the amount of saturation magnetic flux density of the soft-magnetic material of which the magnetic core of the head is formed. As a result, the head cannot write data to the magnetic recording medium when the anisotropic magnetic field of the medium exceeds the write field limit.

Recently, as a method for solving the problem of thermal stability, so-called a thermally-assisted magnetic recording technique is proposed. In the technique, a magnetic recording medium formed of a magnetic material with a large energy $K_U$ is used so as to stabilize the magnetization, then anisotropic magnetic field of a portion of the medium, where data is to be written, is reduced by heating the portion; just after that, writing is performed by applying write field to the heated portion.

In this thermally-assisted magnetic recording technique, there is generally used a method in which a magnetic recording medium is irradiated and thus heated with a light such as near-field light (NF-light). In this case, it is significantly important to stably supply a light with a sufficiently high intensity at a desired position. However, from the beginning, more significant problem to be solved exists in where and how a light source with a sufficiently high output of light should be disposed inside a head.

As for the setting of the light source, for example, U.S. Pat. No. 7,538,978 B2 discloses a configuration in which a laser unit including a laser diode is mounted on the back surface of a slider, and US Patent Publication No. 2008/0056073 A1 discloses a configuration in which a structure of a laser diode element with a monolithically integrated reflection mirror is mounted on the back surface of a slider. Further, US Patent Publication No. 2005/0213436 A1 discloses a structure of slider that is formed together with a semiconductor laser, and Robert E. Rottmayer et al. "Heat-Assisted Magnetic Recording" IEEE TRANSACTIONS ON MAGNETICS, Vol. 42, No. 10, p. 2417-2421 (2006) discloses a configuration in which a diffraction grating is irradiated with a light generated from a laser unit provided within a drive apparatus.

As described above, various types of the setting of the light source are suggested. However, the present inventors propose a thermally-assisted magnetic recording head with a "composite slider structure" which is constituted by joining a light source unit provided with a light source to the end surface (back surface) of a slider provided with a magnetic head element, the end surface being opposite to the opposed-to-medium surface of the slider. The "composite slider structure" is disclosed in, for example, US Patent Publication No. 2008/043360 A1 and US Patent Publication No. 2009/052078 A1. The advantages of the thermally-assisted magnetic recording head with the "composite slider structure" are as follows:

a) The head has an affinity with the conventional manufacturing method of thin-film magnetic heads because the opposed-to-medium surface and the element-integration surface are perpendicular to each other in the slider.

b) The light source can avoid suffering mechanical shock directly during operation because the light source is provided far from the opposed-to-medium surface.

c) The light source such as a laser diode and the magnetic head elements can be evaluated independently of each other; thus the degradation of manufacturing yield for obtaining the whole head can be avoided; whereas, in the case that all the light source and magnetic head elements are provided within the slider, the manufacturing yield rate for obtaining the whole head is likely to decrease significantly due to the multiplication of the process yield for the light-source and the process yield for the slider.

d) The head can be manufactured with reduced man-hour and at low cost, because of no need to provide the head with optical components such as a lens or prism which are required to have much high accuracy, or with optical elements having a special structure for connecting optical fibers or the like.

In the head having the "composite slider structure", light emitted from the light-emission center located in the light-emitting surface of the light source needs to be incident accurately on the light-receiving end of an optical system such as a waveguide located on the back surface of the slider to achieve sufficiently high light use efficiency. Therefore, the light-emission center and the light-receiving end need to be aligned with each other as accurately as possible both in the track width direction and the direction perpendicular to the track width direction. It is preferable that the accuracy of the alignment be within ±1 micrometer (μm) in actual manufacturing. Therefore, it is an important issue to properly align and bond a light source unit and a slider in manufacturing of a head having the "composite slide structure".

In particular, bonding of the light source unit and the slider needs to be performed in such a way that the bonding does not adversely affect the elements in the head while maintaining the achieved alignment accuracy. For example, if an organic adhesive such as an ultraviolet (UV) curable resin is used for the bonding, some measures should be taken to prevent the light source unit and the slider from being displaced with respect to each other in the process of curing the adhesive. In addition, considerations need to be made to prevent relative misalignment between the light source unit and the slider during use of the head after the adhesive has cured and bonding has been completed.

On the other hand, there is a method for bonding the light source unit and the slider by using an alloy as solder to join them with higher adhesive strength and less change with time. However, in the conventional soldering methods, the light source unit and the slider are heated in a heating unit in the process of melting solder, and are therefore exposed to a considerably high temperature for certain duration of time. Especially, the slider typically includes an electromagnetic transducer for writing data and an MR element for reading data. When these magnetic head elements are heated to a high temperature higher than 200° C., for example, the magnetic pole tends to thermally expand to protrude to an undesirable extent or an MR multilayer structure tends to degrade, which can result in defects. Furthermore, considerations need to be made so that the bonding in the light source unit between the unit substrate and the light source can avoid being adversely affected by the heating of the light source unit and the slider in the process of melting the solder.

For these reasons, it is critically important to find a more appropriate method for bonding the light source unit and the slider in manufacturing of a head having the "composite slider structure".

SUMMARY OF THE INVENTION

Some terms used in the specification will be defined before explaining the present invention. In a layered structure or an element structure formed in the element-integration surface of a slider substrate or in the source-installation surface of a unit substrate of the magnetic recording head according to the present invention, when viewed from a standard layer or element, a substrate side is defined as "lower" side, and the opposite side as an "upper" side. Further, "X-, Y- and Z-axis directions" are indicated in some figures showing embodiments of the head according to the present invention as needed. Here, Z-axis direction indicates above-described "up-and-low" direction, and +Z side corresponds to a trailing side and -Z side to a leading side. And Y-axis direction indicates a track width direction, and X-axis direction indicates a height direction.

According to the present invention, a method for manufacturing a thermally-assisted magnetic recording head is provided, in which a light source unit including a light source provided in a unit substrate and a slider including an optical system provided in a slider substrate are joined with each other, wherein the unit substrate is made of a material transmitting light having a predetermined wavelength and a unit adhesion material layer is formed on a surface of one or each of the light source unit and the slider, the unit adhesion material layer (solder layer) containing a material selected from a group consisting of Sn (tin), Sn alloy, Pb (lead) alloy and Bi (bismuth) alloy. This manufacturing method comprises the steps of:

aligning the light source unit and the slider with each other in such a way that a light generated from the light source can enter the optical system and the unit adhesion material layer is sandwiched between the light source unit and the slider;

causing a light including the predetermined wavelength to enter the unit substrate to melt the unit adhesion material layer; and bonding the light source unit and the slider with each other.

In the above-described manufacturing method of the thermally-assisted magnetic recording head, since the unit adhesion material layer can be melted by the light that includes a predetermined wavelength and has been transmitted through the unit substrate in bonding of the light source unit and the slider, high alignment accuracy can be achieved while joining with higher bonding strength and less change with time can be achieved. Further, the use of the unit adhesion material layer made of Sn, Sn alloy, Pb alloy or Bi alloy enables joining that does not adversely affect the joining between the unit substrate and the light source by a light-source adhesion material layer (solder layer).

Further, in the manufacturing method according to the present invention, it is preferable that the unit adhesion material layer contains a material selected from a group consisting of Sn, SnAu, SnCu, SnAl, SnSi, SnGe, SnMg, SnPb, SnAg, SnZn, SnBi, SnNi, SnPt, PbAu, PbMg, PbBi and BiAu. Furthermore, the unit adhesion material layer is preferably made of a material having a melting point lower than a melting point of a light-source adhesion material layer used for joining the light source to an electrode provided on the unit substrate, and is more preferably made of a material having a melting point lower, by 30° C. or more, than the melting point of the light-source adhesion material layer. Further, a reflective layer is preferably provided on a surface of the unit substrate opposed to the slider substrate when joined to the slider, the reflective layer reflecting the light including the predetermined wavelength.

Furthermore, in the manufacturing method according to the present invention, it is preferable that the light source is activated, and the light source unit and the slider are aligned in such a way that the light generated from the light source enters the optical system. This alignment method is a so-called active alignment method, which can achieve high alignment accuracy. Furthermore, it is also preferable that the melting of the unit adhesion material layer by the entering of the light including the predetermined wavelength is assisted by heating the unit adhesion material layer to a high temperature with a heat generated from the activated light source.

In the alignment using the active alignment method according to the present invention, it is preferable that the unit adhesion material layer is repeatedly melted by causing the lights including the predetermined wavelength to enter the unit substrate from different directions, to correct variations in relative positions of the light source unit and the slider caused by the melting of the unit adhesion material layer. In this preferable case, it is also preferable that the amount of displacement of the light source unit and the slider with respect to each other is obtained beforehand in the case that the unit adhesion material layer is irradiated with a predetermined one shot of each of the lights from different directions, then the number of shots of each of the lights from different directions is determined.

Further, in the manufacturing method according to the present invention, it is preferable that the slider comprises a magnetic head element configured to write and/or read data, and the slider substrate is made of a material having a lower thermal conductivity than a material of the unit substrate so that conduction of a heat generated by the entering of the light including the predetermined wavelength to the magnetic head element is limited. By controlling the thermal conductivity of the slider substrate, irradiating the unit adhesion material layer with the light that includes the predetermined wavelength and has passed through the unit substrate and melting the layer, adverse influence of heat generated by the irradiation on the magnetic head element provided in the slider can be avoided. Further, it is also preferable that, during the alignment, a holding means to hold the light source unit is used as a heatsink for the heat generated by the entering of the light including the predetermined wavelength.

Further, in the manufacturing method according to the present invention, it is preferable that the unit substrate is made of a material selected from a group consisting of Si (silicon), GaAs (gallium arsenide) and SiC (silicon carbide), and a YAG laser light is used as the light including the predetermined wavelength. Here, YAG is the name of a crystal having a garnet structure, made of a composite oxide ($Y_3Al_5O_{12}$) of Y (yttrium) and Al (aluminum). Nd-YAG laser light can be obtained by using a YAG crystal in which a several percent of Y is replaced with Nd (neodymium) as the laser medium, and is widely used in research, industrial, medical and other applications.

Furthermore, in the manufacturing method according to the present invention, it is preferable that, as the light including the predetermined wavelength, a circularly- or elliptically-polarized light is preferably used, and a P-polarized light is also preferably used. By using such light, the light that includes the predetermined wavelength and has entered the unit substrate can be more absorbed into the unit substrate. As a result, the unit adhesion material layer can be melted more efficiently, thereby achieving good joining.

According to the present invention, a thermally-assisted magnetic recording head is further provided, which comprises:

a light source unit comprising: a unit substrate made of a material transmitting light having a predetermined wavelength; and a light source provided in a source-installation surface of the unit substrate; and a slider comprising: a slider substrate made of a material having a lower thermal conductivity than a material of the unit substrate; a magnetic head element configured to write and/or read data and provided in an element-integration surface of the slider substrate; and an optical system configured to propagate a light from the light source toward a magnetic recording medium and provided in the element-integration surface, the light source unit and the slider being bonded by an adhesion material layer melted and solidified with a light that includes the predetermined wavelength and has passed through the unit substrate, and the unit adhesion material layer containing a material selected from a group consisting of Sn (tin), Sn alloy, Pb (lead) alloy and Bi (bismuth) alloy.

Further objects and advantages of the present invention will be apparent from the following description of preferred embodiments of the invention as illustrated in the accompanying figures. In each figure, the same element as an element shown in other figure is indicated by the same reference numeral. Further, the ratio of dimensions within an element and between elements becomes arbitrary for viewability.

BRIEF DESCRIPTION OF THE DRAWINGS

FIG. 9 shows a schematic view illustrating an experimental system used in the simulation for studying the effect of polarization of Nd-YAG laser light on absorption of the Nd-YAG laser light into the unit substrate.

DESCRIPTION OF THE PREFERRED EMBODIMENTS

Figure 1:
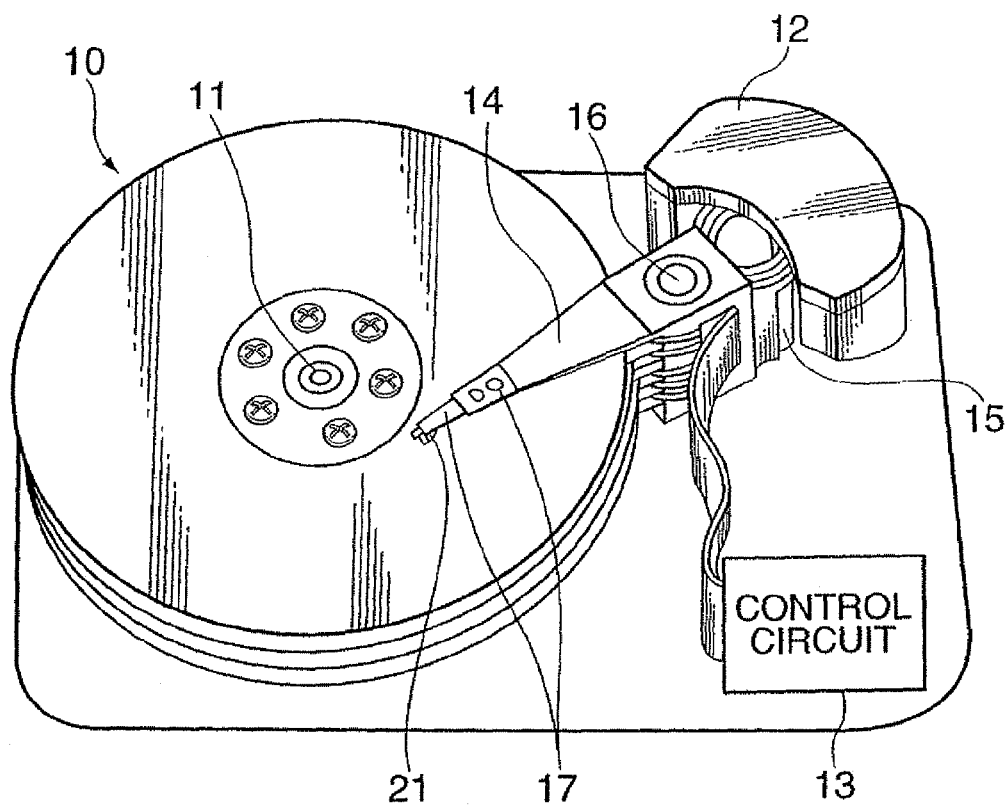
FIG. 1 shows a perspective view schematically illustrating a structure of a major part in one embodiment of a magnetic disk apparatus according to the present invention.
Figure 2:
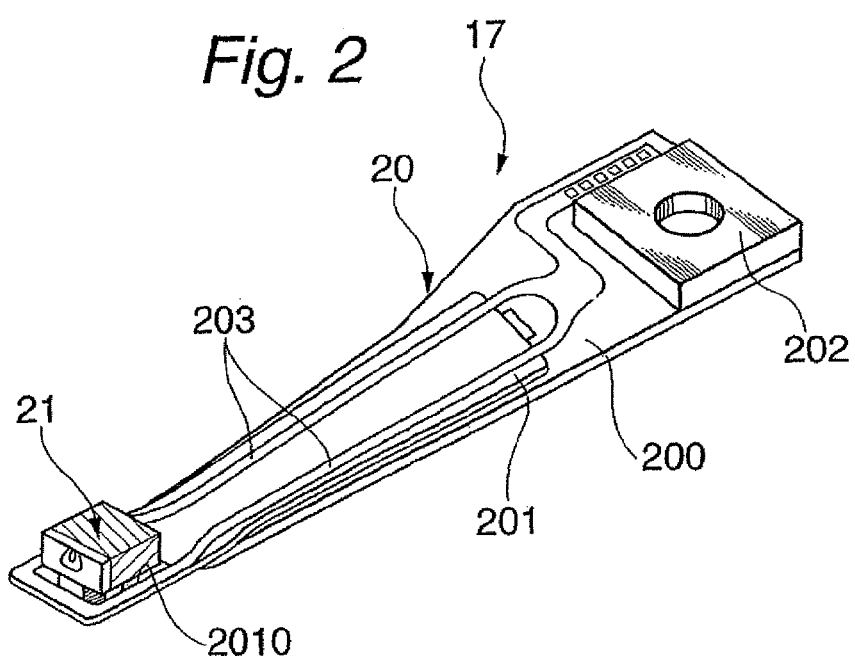
FIG. 2 shows a perspective view schematically illustrating a structure of a major part in one embodiment of a head gimbal assembly (HGA) according to the present invention.

FIG. 1 shows a perspective view schematically illustrating a structure of a major part in one embodiment of a magnetic disk apparatus according to the present invention. FIG. 2 shows a perspective view schematically illustrating a structure of a major part in one embodiment of a head gimbal assembly (HGA) according to the present invention. In FIG. 2, the side of the HGA opposed to the surface of a magnetic disk is presented as the upper side.

A magnetic disk apparatus as a magnetic recording apparatus shown in FIG. 1 includes: a plurality of magnetic disks 10 rotating around a rotational axis of a spindle motor 11; an assembly carriage device 12 provided with a plurality of drive arms 14 thereon; an HGA 17 attached on the top end portion of each drive arm 14 and provided with a thermally-assisted magnetic recording head 21; and a recording/reproducing and light-emission control circuit 13 for controlling write/read operations of the thermally-assisted magnetic recording head 21 and further for controlling the emission operation of a laser diode as a light source that generates laser light for thermally-assisted magnetic recording, which will be described later.

The magnetic disk 10 is, in the present embodiment, designed for perpendicular magnetic recording, and has a structure in which, for example, sequentially stacked on a disk substrate is: a soft-magnetic under layer; an intermediate layer; and a magnetic recording layer (perpendicular magnetization layer). The assembly carriage device 12 is a device for positioning the thermally-assisted magnetic recording head 21 above a track formed on the magnetic recording layer of the magnetic disk 10, on which recording bits are aligned. In the apparatus, the drive arms 14 are stacked in a direction along a pivot bearing axis 16 and can be angularly swung around the axis 16 by a voice coil motor (VCM) 15. The structure of the magnetic disk apparatus according to the present invention is not limited to that described above. For instance, the number of each of magnetic disks 10, drive arms 14, HGAs 17 and sliders 21 may be one.

Referring to FIG. 2, a suspension 20 in the HGA 17 includes a load beam 200, a flexure 201 with elasticity fixed to the load beam 200, a base plate 202 provided on the base portion of the load beam 200, and a wiring member 203 provided on the flexure 201 and made up of lead conductors and connection pads electrically joined to both ends of the lead conductors. The thermally-assisted magnetic recording head 21 is fixed to the flexure 201 at the top end portion of the suspension 20 so as to face the surface of each magnetic disk 10 with a predetermined space (flying height). Here, an aperture 2010 is provided in the flexure 201; the thermally-assisted magnetic recording head 21 is fixed in such a way that a part of the head 21 (light source unit 23 in FIG. 3) protrudes from the opposite side of the aperture 2010. Moreover, one ends (connection pads) of the wiring member 203 are electrically connected to terminal electrodes of the thermally-assisted magnetic recording head 21. The structure of the suspension 20 is not limited to the above-described one. An IC chip for driving the head may be mounted midway on the suspension 20, though not shown.

Figure 3:
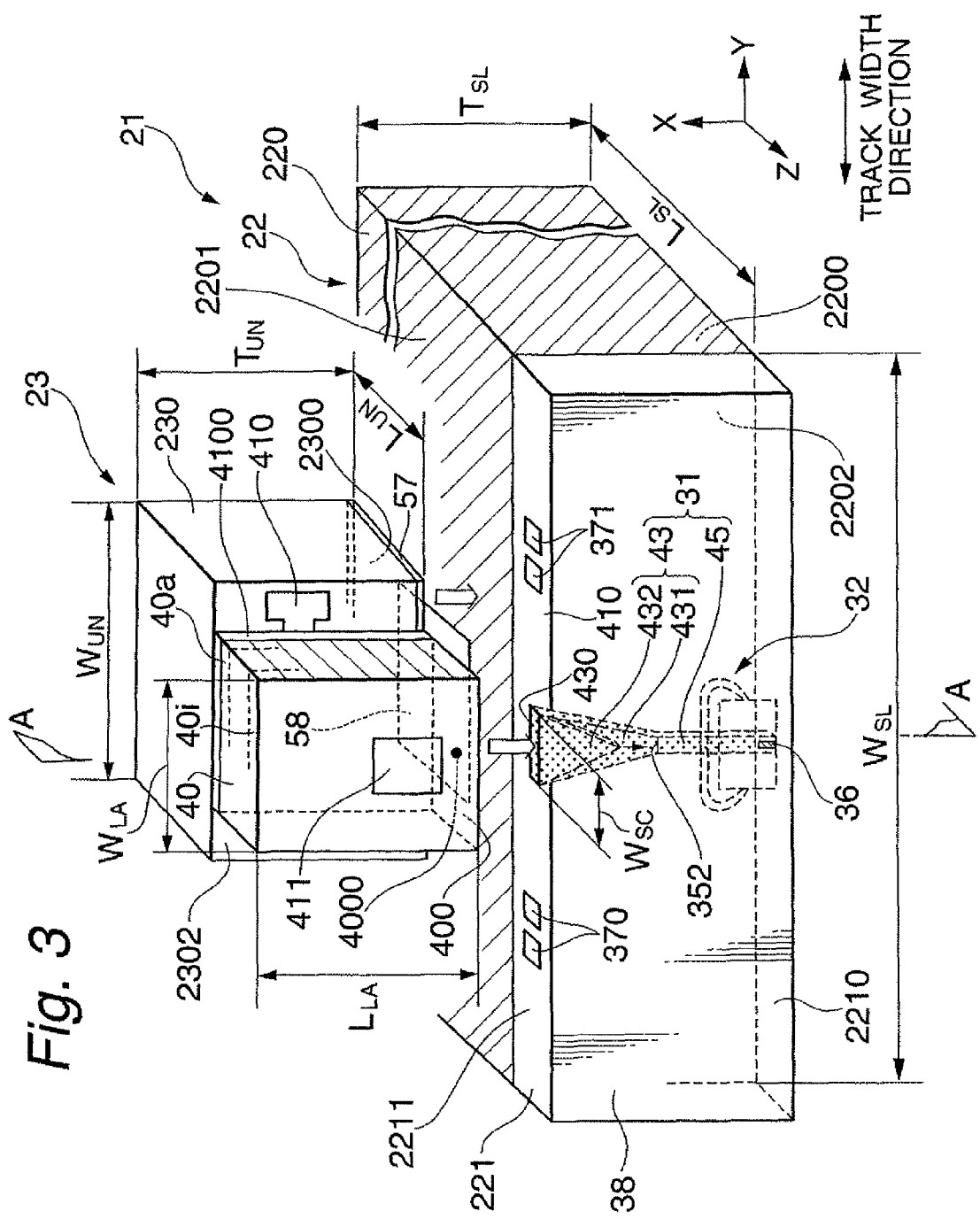
FIG. 3 shows a perspective view illustrating one embodiment of the thermally-assisted magnetic recording head according to the present invention.

FIG. 3 shows a perspective view illustrating one embodiment of the thermally-assisted magnetic recording head 21 according to the present invention.

As shown in FIG. 3, a thermally-assisted magnetic recording head 21 is constituted by aligning and joining a light source unit 23 that includes a laser diode 40 and a slider 22 that includes an optical system 31. The slider 22 includes: a slider substrate 220 having an air bearing surface (ABS) 2200 processed so as to provide an appropriate flying height; and a head element part 221 formed on an element-integration surface 2202 that is perpendicular to and adjacent to the ABS 2200. While, the light source unit 23 includes: a unit substrate 230 having an joining surface 2300; and a laser diode 40 as a light source provided on a source-installation surface 2302 that is perpendicular to and adjacent to the joining surface 2300. The slider 22 and the light source unit 23 are bonded to each other in such a way that the back surface 2201 of the slider substrate 220 and the joining surface 2300 of the unit substrate 230 are opposed to each other and sandwich a solder layer 58 as a unit adhesion material.

Here, the unit substrate 230 is made of a material that transmits a laser light used for bonding the light source unit 23 and the slider 22 together, which will be described in detail later. If Nd-YAG laser light (wavelength: 1064 nanometers (nm)), which will be described later, is used, the unit substrate 230 is preferably made of a material that has a transmittance greater than or equal to 50% at a wavelength of 1064 nm, such as Si (transmittance: 67%), GaAs (transmittance: 66%), or SiC (transmittance: 80%). This ensures the bonding between the light source unit 23 and the slider 22 using laser light, which will be described later.

The slider substrate 220 is preferably made of a material that has a lower thermal conductivity than the material of the unit substrate 230 for reasons that will be described later. For example, if the unit substrate 230 is made of Si (thermal conductivity: 168 W/(m·K)), the slider substrate 220 is preferably made of a material such as AlTic ($Al_2O_3$-Tic) (thermal conductivity: 19.0 W/(m·K)) or $SiO_2$ (thermal conductivity: 10.7 W/(m·K)). This can minimize adverse influence of heat on a magnetic head element 32, the heat being generated by laser irradiation used for bonding between the light source unit 23 and the slider 22.

Further, the solder layer 58 is a unit adhesion material layer melted and solidified by irradiating the unit substrate 230 with laser light. The solder layer 58 joins the light source unit 23 to the slider 22. The solder layer 58 is preferably made of an alloy having a melting point lower than 400° C., more preferably lower than or equal to 250° C. Further, the solder layer 58, which is the unit adhesion material layer, is preferably made of a material having a melting point lower than a solder layer 52 (FIG. 4), which is a light-source adhesion material layer used for joining the laser diode 40 to the unit electrode 4100 provided on the unit substrate 230, more preferably a material having a melting point lower than the solder layer 52 by 30° C. or more, as will be described later in detail. For example, if the solder layer 52 is made of an AuSn alloy (containing 80 weight % of Au), the melting point of the solder layer 52 is in the range of approximately 280 to 300° C. In that case, the solder layer 58 may be made of Sn, or a Sn alloy, a Pb alloy or a Bi alloy which have a melting point at the eutectic composition (a eutectic point) lower than or equal to 250° C. Here, the solder layer 58 has a higher thermal conductivity than the slider substrate 220, and heat generated by laser irradiation can be used more in melting the solder layer 58 than in being conducted to the slider substrate 220. The thickness of the solder layer 58 may be in the range of approximately 0.05 to 5.0 micrometers (μm), for example.

As also shown in FIG. 3, in the slider 22, the head element part 221 formed on the element-integration surface 2202 of the slider 22 includes: a head element 32 constituted of a magnetoresistive (MR) element 33 for reading data from the magnetic disk 10 (FIG. 1) and an electromagnetic transducer 34 for writing data to the magnetic disk; a spot-size converter 43 that receives a laser light emitted from the laser diode 40, changes (reduces) the spot size of the laser light, then guides the laser light into the waveguide 35; a waveguide 35 that guides the laser light with changed spot size to the head end surface 2210 as an opposed-to-medium surface or its vicinity; a near-field light (NF-light) generator 36 that generates NF-light for thermal assist; and an overcoat layer 38 formed on the element-integration surface 2202 so as to cover the head element 32, the spot-size converter 43, the waveguide 35 and the NF-light generator 36. Here, the spot-size converter 43, the waveguide 35 and the NF-light generator 36 constitute the optical system 31 for generating NF-light in the head 21 (head element part 221).

Further, the slider 22 includes a pair of terminal electrodes 370 and a pair of terminal electrodes 371, which are provided for the head element 32, formed on the end surface 2211 of the head element part 221, the end surface 2211 being on the side opposite to the opposed-to-medium surface (head end surface) 2210. Further, the light source unit 23 includes a terminal electrode 410 connected electrically to an n-electrode layer 40a of the laser diode 40 and provided on the source-installation surface 2302. The light source unit 23 further includes a terminal electrode 411 connected electrically to a p-electrode layer 40i of the laser diode 40 and provided on the p-electrode layer 40i. These terminal electrodes 370, 371, 410 and 411 are electrically connected to the connection pads of the wiring member 203 provided on the flexure 201 by wire bonding, solder ball bonding (SBB), or the like.

One ends of the MR element 33, the electromagnetic transducer 34 and the NF-light generator 36 reach the head end surface 2210 as an opposed-to-medium surface. Here, the head end surface 2210 and the ABS 2200 constitute the whole opposed-to-medium surface of the thermally-assisted magnetic recording head 21. During actual write and read operations, the thermally-assisted magnetic recording head 21 aerodynamically flies above the surface of the rotating magnetic disk with a predetermined flying height. Thus, the ends of the MR element 33 and electromagnetic transducer 34 face the surface of the magnetic record layer of the magnetic disk 10 with a appropriate magnetic spacing. Then, MR element 33 reads data by sensing signal magnetic field from the magnetic record layer, and the electromagnetic transducer 34 writes data by applying signal magnetic field to the magnetic record layer. When writing data, laser light, which is generated from the laser diode 40 of the light source unit 23 and propagates through the spot-size converter 43 and the waveguide 35, is changed into NF-light in the NF-light generator 36. Then, a portion to be written of the magnetic recording layer is irradiated and thus heated with the NF-light. As a result, the anisotropic magnetic field (coercive force) of the portion is decreased to a value that enables writing; thus the thermally-assisted magnetic recording can be achieved by applying write field with use of the electromagnetic transducer 34 to the anisotropic-field-decreased portion.

Referring also to FIG. 3, a spot-size converter 43 is an optical element which receives laser light emitted from the laser diode 40 at its light-receiving end surface 430 having a width $W_{SC}$ in the track width direction (the Y-axis direction), converts the laser light to laser light with a smaller spot diameter with a low loss while maintaining a single mode, and then guides the converted laser light to a light-receiving end surface 352 of the waveguide 35. Here, the single-mode is a mode in which the laser light propagating within the spot-size converter 43 has a beam cross-section with a shape of circle or ellipsoid, and the light intensity distribution in the cross-section is single-peaked, especially a Gaussian. Laser light with a single mode can become a stable laser light with an intended intensity even in the case that the spot size of the laser light is converted into a smaller one due to the propagation through the spot-size converter 43. The spot-size converter 43 in the present embodiment includes a lower propagation layer 431 and an upper propagation layer 432. The lower propagation layer 431 has a width in the track width direction (Y-axis direction) that gradually decreases from the width $W_{SC}$ along the traveling direction (−X direction) of laser light incident through the light-receiving end surface 430. The upper propagation layer 432 is stacked on the lower propagation layer 431 and has a width in the track width direction (Y-axis direction) that more steeply decreases from the width $W_{SC}$ along the traveling direction (−X direction) of laser light than the lower propagation layer 431. Laser light incident through the light-receiving end surface 430 is converted to laser light with a smaller spot size as the laser light propagates through the layered structure, and reaches the light-receiving end surface 352 of the waveguide 35.

The width $W_{SC}$ of the spot-size converter 43 at the light-receiving end surface 430 may be in the range of approximately 1 to 10 μm, for example. The thickness $T_{SC}$ (in Z-axis direction) at the light-receiving end surface 430 may be in the range of approximately 1 to 10 μm, for example. The light-receiving end surface 430 is preferably inclined at a predetermined acute angle, for example at an angle of approximately 4° (degrees) with respect to the end surface 400 including the light-emission center 4000 of the laser diode 40. Such angle prevents laser light reflected by the light-receiving end surface 430 from returning to the light-emission center 4000. The spot-size converter 43 is made of a material with a refractive index higher than the refractive index $n_{OC}$ of the constituent material of the surrounding overcoat layer 38. The spot-size converter 43 can be formed from the same dielectric material as the waveguide 35, which will be described below. In the case, the spot-size converter 43 and the waveguide 35 may be formed integrally.

The waveguide 35 in the present embodiment extends in parallel with the element-integration surface 2202 from the light-receiving end surface 352 that receives laser light emitted from the spot-size converter 43 to the end surface 350 on the head end surface 2210 side. Here, the end surface 350 may be a portion of the head end surface 2210, or may be recessed from the head end surface 2210 with a predetermined distance. A portion of one side surface of the waveguide 35 near the end surface 350 faces a NF-light generator 36. This allows laser light (waveguide light) incident through the light-receiving end surface 352 and traveling through the waveguide 35 to reach the portion facing the NF-light generator 36, thereby to be coupled with the generator 36.

Referring again to FIG. 3, a unit electrode 4100 is provided on the source-installation surface 2302 of the unit substrate 230 of the light source unit 23. The unit electrode 4100 may be formed by a foundation layer of a material such as Ta or Ti with a thickness of approximately 10 nm, for example, and a conducting layer of a conductive material such as Au, Cu or an alloy of Au with a thickness in the range of approximately 1 to 5 μm, for example. The terminal electrode 410 is electrically connected with the n-electrode layer 40a of the laser diode 40 through the unit electrode 4100, the n-electrode layer 40a having a surface contact with the unit electrode 4100. The terminal electrode 411 may be a conductive layer formed on the p-electrode layer 40i of the laser diode 40, and made of, for example, Au, Cu or Au alloy with a thickness in the range of approximately 1 to 5 μm. When a predetermined voltage is applied between the n-electrode layer 40a and a p-electrode layer 40i of the laser diode 40 through these terminal electrodes 410 and 411, the laser diode 40 oscillates and laser light is emitted from the light-emission center 4000.

Furthermore, preferably a reflective layer 57 is provided on the joining surface 2300 of the unit substrate 230. The reflective layer 57 reflects light 78 such as Nd-YAG laser light (FIG. 7c) that is used in joining the light source unit 23 to the slider 22 and is propagating through the unit substrate 230 so that a sufficient amount of the light 78 is absorbed into the unit substrate 230, as will be described later in detail.

As also shown in FIG. 3, the slider substrate 220 is, for example, a so-called Femto slider having a thickness (in X-axis direction) $T_{SL}$ of 230 μm, a width $W_{SL}$ of 700 μm in the track width direction (Y-axis direction), and a length $L_{SL}$ (in Z-axis direction) of 850 μm. The Femto slider is commonly used as the substrate of a thin-film magnetic head capable of achieving a high recording density and is the smallest in standardized size among the currently used sliders. On the other hand, the unit substrate 230 is somewhat smaller than the slider substrate 220. In particular, the width $W_{UN}$ of the unit substrate 230 in the track width direction (Y-axis direction) is preferably greater than or equal to the width $W_{LA}$ of the laser diode 40 in the track width direction (Y-axis direction), and is preferably smaller than the width $W_{SL}$ of the slider substrate 220. The width setting enables a laser light for melting the solder layer 58 to reach the solder layer 58 by being transmitted through the unit substrate 230 without irradiating and heating the slider substrate 220 with the laser light during the transmission, as described in detail later. Considering the requirements described above, the unit substrate 230 may have a thickness $T_{UN}$ (in X-axis direction) of 320 μm, a width $W_{UN}$ in the track width direction of 350 μm, and a length L (in Z-axis direction) of 250 μm, for example.

As described above, the thermally-assisted magnetic recording head 21 has the structure in which the slider 22 and the light source unit 23 are interconnected. Thus, the slider 22 and the light source unit 23 can be separately fabricated and then combined together to fabricate the head 21. Consequently, the production yield of the entire heads is about the same as the production yield of the sliders 22 if performance evaluation of the light source units 23 is performed prior to the fabrication of the heads and only good light source units 23 are used for the fabrication of the heads. Thus, the reduction of production yield of the entire heads due to the rejection rate of the laser diodes 40 can be avoided. Furthermore, since the light source unit 23 is attached to the back surface 2201 of the slider 22 which is opposite to the ABS 2200 of the slider 22, the laser diode 40 can be always disposed in a location far from the ABS 2200. As a result, direct mechanical impact on the laser diode 40 in operation can be avoided. Moreover, since the ABS 2200 of the slider 22 is perpendicular to the element-integration surface 2202, the slider 22 has a high affinity for conventional thin-film magnetic head fabrication processes. Since an optical part that requires a considerably high accuracy such as an optical pickup lens or an optical part that requires a special structure for connection such as an optical fiber do not need to be provided in the thermally-assisted magnetic recording head 21, the number of man-hours and thus costs can be reduced.

Figure 4:
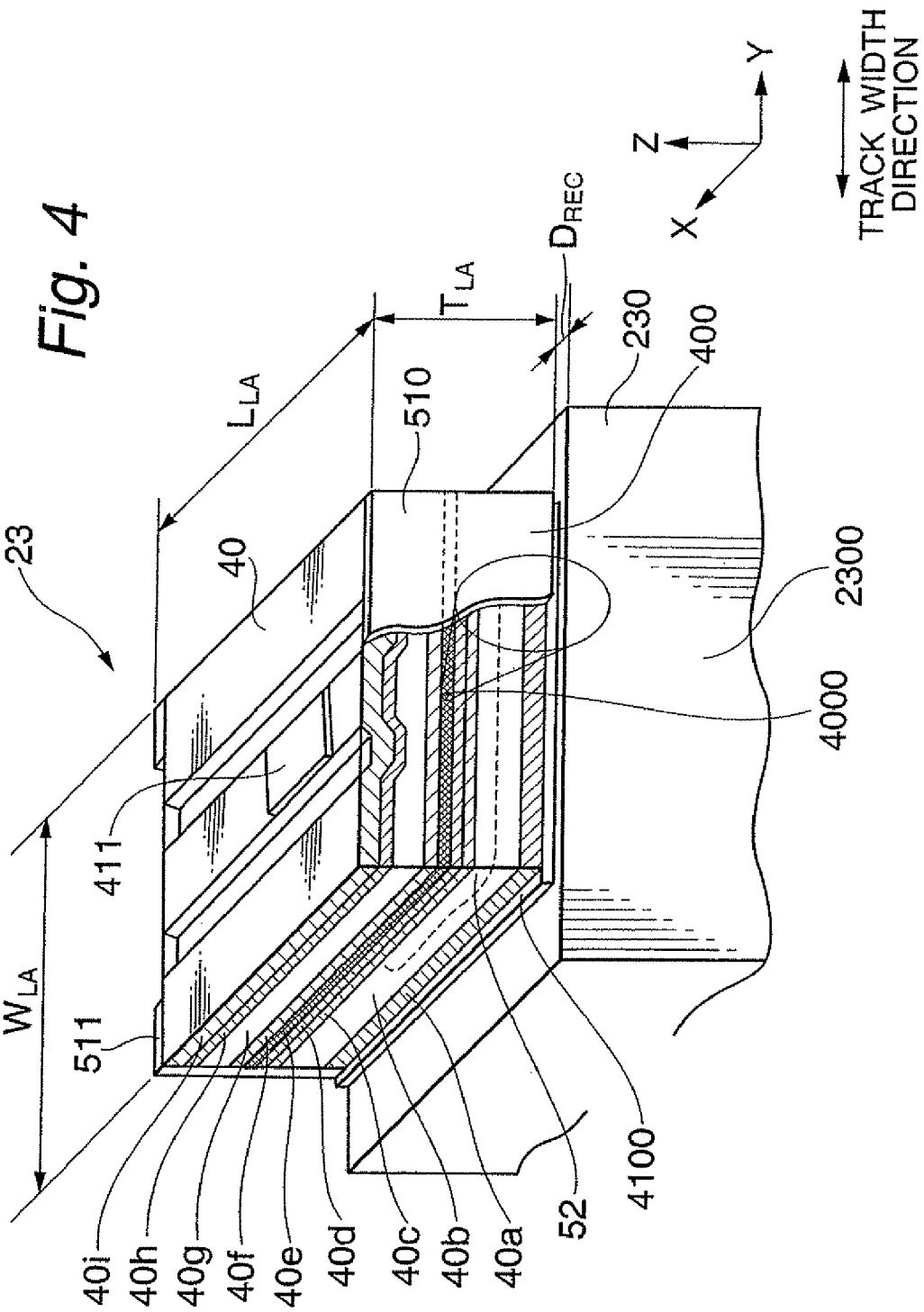
FIG. 4 shows a perspective view illustrating the structure of a laser diode and the state of joining the laser diode to a unit substrate.

FIG. 4 shows a perspective view illustrating the structure of the laser diode 40 and the state of joining the laser diode 40 to the unit substrate 230.

According to FIG. 4, the laser diode 40 is, in the present embodiment, of edge-emitting type. As the laser diode 40, InP base, GaAs base or GaN base diodes can be utilized, which are usually used for communication, optical disk storage, material analysis or the like. The wavelength $\lambda_L$ of the emitted laser light may be, for example, in the range of approximately 375 nm to 1.7 μm. For example, a laser diode of InGaAsP/InP quaternary mixed crystal can be used, in which possible wavelength region is set to be from 1.2 to 1.67 μm. Here, the laser diode 40 shown in FIG. 4 has a multilayered structure in which sequentially stacked from the unit substrate 230 side are: an n-electrode layer 40a having a surface contact and bonded with the unit electrode 4100; an n-GaAs substrate 40b; an n-InGaAlP clad layer 40c; the first InGaAlP guide layer 40d; an active layer 40e formed of multiquantum well (InGaP/InGaAlP) or the like; the second InGaAlP guide layer 40f; an p-InGaAlP clad layer 40g; a p-electrode base layer 40h; and a p-electrode layer 40i.

The n-electrode layer 40a and the p-electrode layer 40i may be formed of, for example, Au or Au alloy with thickness of approximately 5 μm. Alternatively, the p-electrode layer 40i may be bonded to the unit substrate 4100 by turning the laser diode 40 upside down. Further, on the front and rear cleaved surfaces of the multilayered structure of the laser diode 40, respectively formed are reflective layers 510 and 511 for exciting the oscillation by total reflection. The outer surface of the reflective layer 510 on the joining surface 2300 side is a light-emission surface 400, and the light-emission surface 400 includes a light-emission center 4000 at the position of the active layer 40e. The laser diode 40 has a width $W_{LA}$ of, for example, approximately 150 to 250 μm. The length $L_{LA}$ of the laser diode 40 corresponds approximately to a cavity length that is the distance between the reflective layers 510 and 511, and is, for example, 300 μm. The length $L_{LA}$ is preferably 300 μm or more in order to obtain a sufficient high output. Further, the height $T_{LA}$ of the laser diode 40 is, for example, approximately 60 to 200 μm.

An electric source provided within the magnetic disk apparatus can be used for driving the laser diode 40. In fact, the magnetic disk drive apparatus usually has an electric source with applying voltage of, for example, approximately 2 to 5V, which is sufficient for the laser oscillation. Even in the case that the amount of electric power consumption of the laser diode 40 is, for example, in the vicinity of one hundred mW, the amount can be covered sufficiently by the electric source provided within the magnetic disk apparatus.

Referring again to FIG. 4, the n-electrode layer 40a of the laser diode 40 can be soldered to the unit electrode 4100 on the unit substrate 230 by the solder layer 52, which is a light-source adhesion material layer. The solder layer 52 is preferably made of a material having a melting point higher than the solder layer 58 (FIG. 3), which is a unit adhesion material layer, as will be described later in detail. For example, if the solder layer 58 is made of Sn (tin, which has a melting point of 231° C.), the solder layer 52 may be made of an AuSn alloy (containing 80 weight % of Au and having a melting point in the range of approximately 280 to 300° C.). If the solder layer 58 is made of SnPb (having a melting point of 183° C.), the solder layer 52 may be made of an AuSn alloy (containing 80 weight % of Sn and having a melting point of approximately 220° C.).

Here, preferably the laser diode 40 is bonded onto the unit substrate 230 in such a way that the distance $D_{REC}$ (in X-axis direction) between the light-emitting surface 400 of the laser diode 40 and the joining surface 2300 is 0 or more, and 5 μm or less. Since the distance $D_{REC}$ is greater than or equal to 0, the laser diode 40 does not protrude from the light source unit 23. Consequently, the laser diode 40 is prevented from being subjected to excessive mechanical stress and damage during bonding. Furthermore, since the direction $D_{REC}$ is less than or equal to 5 μm, the distance between the light-emission center 4000 and the light-receiving end surface 430 of the optical system 31 (FIG. 3) of the slider 22 is sufficiently small and therefore a high light use efficiency can be provided.

Figure 5:
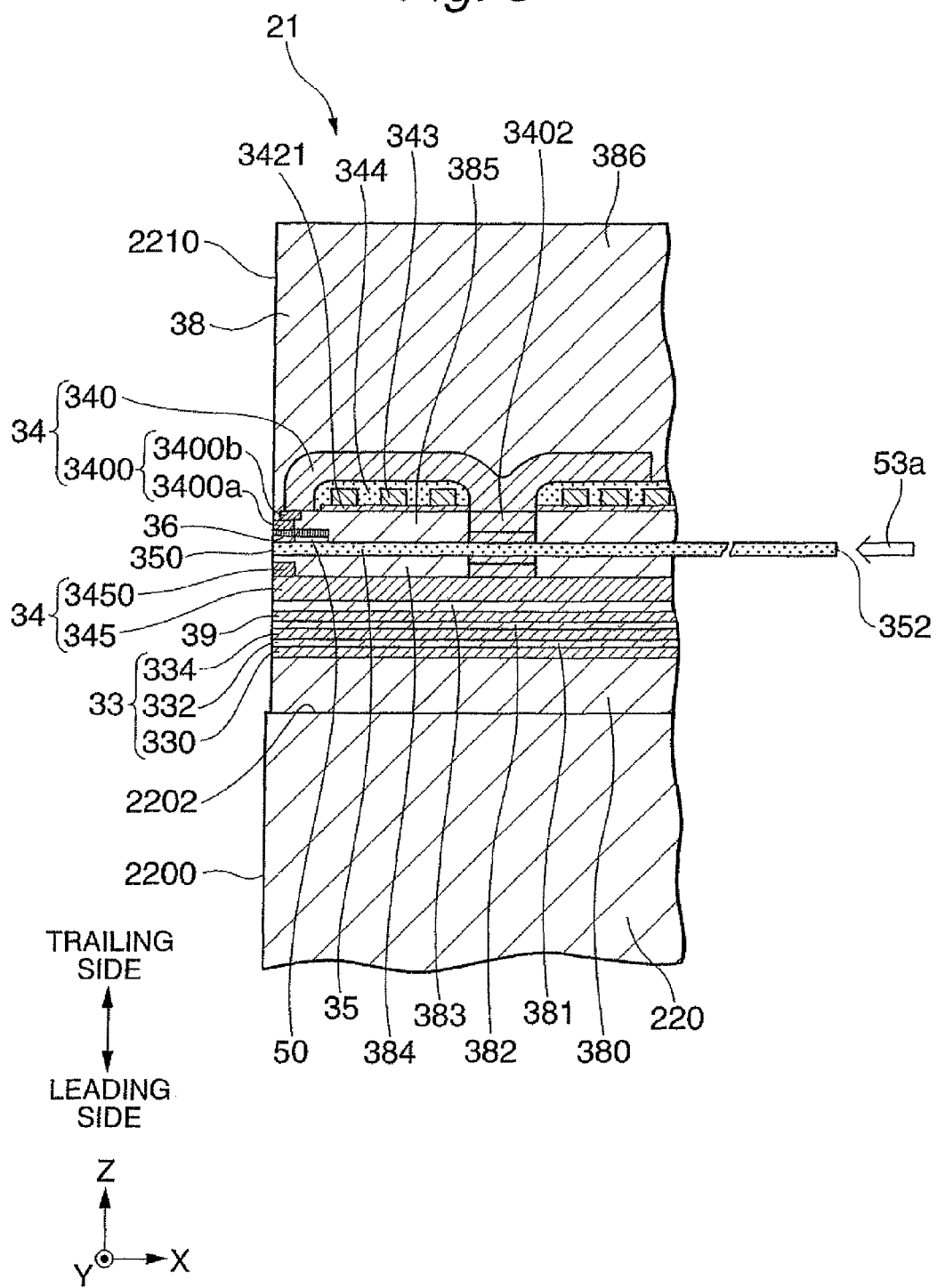
FIG. 5 shows a cross-sectional view taken by plane A in FIG. 3, schematically illustrating the configuration of a head element and its vicinity in the thermally-assisted magnetic recording head.

FIG. 5 shows a cross-sectional view taken by plane A in FIG. 3, schematically illustrating the configuration of the head element 32 and its vicinity in the thermally-assisted magnetic recording head 21.

As shown in FIG. 5, the MR element 33 is formed on a base layer 380 that is formed of an insulating material such as $Al_2O_3$ (alumina), $SiO_2$ and stacked on the element-integration surface 2102. The MR element 33 includes: an MR multilayer 332; and a lower shield layer 330 and an upper shield layer 334 which sandwich the MR multilayer 332 and an insulating layer 381 therebetween. The MR multilayer 332 is a magneto-sensitive part for detecting signal magnetic field by utilizing MR effect. The MR multilayer 332 may be, for example: a current-in-plane giant magnetoresistive (CIP-GMR) multilayer; a current-perpendicular-to-plane giant magnetoresistive (CPP-GMR) multilayer; or a tunnel magnetoresistive (TMR) multilayer. In the case that the MR multilayer 332 is a CPP-CMZ multilayer or a TMR multilayer, the upper and lower shield layers 334 and 330 act as electrodes as well as magnetic shields.

Referring also to FIG. 5, the electromagnetic transducer 34 is designed for perpendicular magnetic recording, and includes an upper yoke layer 340, a main magnetic pole 3400, a write coil layer 343, a coil-insulating layer 344, a lower yoke layer 345, and a lower shield 3450.

The upper yoke layer 340 is formed so as to cover the coil-insulating layer 344, and the main magnetic pole 3400 is formed on an insulating layer 385 made of an insulating material such as $Al_2O_3$ (alumina). These upper yoke layer 340 and main magnetic pole 3400 are magnetically connected with each other, and acts as a magnetic path for converging and guiding magnetic flux toward the magnetic recording layer (perpendicular magnetization layer) of the magnetic disk 10 (FIG. 1), the magnetic flux being excited by write current flowing through the write coil layer 343. The main magnetic pole 3400 includes: a first main pole portion 3400a reaching the head end surface 2210 and having a small width $W_P$ (FIG. 6) in the track width direction; and a second main pole portion 3400b located on the first main pole portion 3400a and at the rear (+X side) of the portion 3400a. The first main pole portion 3400a has an end surface 3400e (FIG. 6) with a shape of, for example, a rectangle, a square or a trapezoid on the head end surface 2210. Here, the above-described width $W_P$ is the length of an edge in the track width direction (Y-axis direction) of the end surface 3400e, and defines the width of write field distribution in the track width direction (Y-axis direction). The width $W_P$ can be set to be, for example, 0.05 to 0.5 µm. The main magnetic pole 3400 is preferably formed of a soft-magnetic material with a saturation magnetic flux density higher than that of the upper yoke layer 340, which is, for example, an iron alloy containing Fe as a main component, such as FeNi, FeCo, FeCoNi, FeN or FeZrN. The thickness of the first main pole portion 3400a is, for example, in the range of approximately 0.1 to 0.8 µm.

The write coil layer 343 is formed on an insulating layer 385 made of an insulating material such as $Al_2O_3$ (alumina), in such a way as to pass through in one turn at least between the lower yoke layer 345 and the upper yoke layer 340, and has a spiral structure with a back contact portion 3402 as a center. The write coil layer 343 is formed of a conductive material such as Cu (copper). The write coil layer 343 is covered with a coil-insulating layer 344 that is formed of an insulating material such as a heat-cured photoresist and electrically isolates the write coil layer 343 from the upper yoke layer 340. The write coil layer 343 has a monolayer structure in the present embodiment; however, may have a two or more layered structure or a helical coil shape. Further, the number of turns of the write coil layer 343 is not limited to that shown in FIG. 5, and may be, for example, in the range from two to seven.

The back contact portion 3402 has a though-hole extending in X-axis direction, and the waveguide 35 and insulating layers that covers the waveguide 35 pass through the though-hole. In the though-hole, the waveguide 35 is away at a predetermined distance of, for example, at least 1 µm from the inner wall of the back contact portion 3402. The distance prevents the absorption of the waveguide light by the back contact portion 3402.

The lower yoke layer 345 is formed on an insulating layer 383 made of an insulating material such as $Al_2O_3$ (alumina), and acts as a magnetic path for the magnetic flux returning from a soft-magnetic under layer that is provided under the magnetic recording layer (perpendicular magnetization layer) of the magnetic disk 10. The lower yoke layer 345 is formed of a soft-magnetic material, and its thickness is, for example, approximately 0.5 to 5 µm. Further, the lower shield 3450 is a part of the magnetic path, being connected with the lower yoke layer 345 and reaching the head end surface 2210. The lower shield 3450 is opposed to the main magnetic pole 3400 through the NF-light generator 36, and acts for receiving the magnetic flux spreading from the main magnetic pole 3400. The lower shield 3450 has a width in the track width direction greatly larger than that of the main magnetic pole 3400. This lower shield 3450 causes the magnetic field gradient between the end portion of the lower shield 3450 and the first main pole portion 3400a to become steeper. As a result, jitter of signal output becomes smaller, and therefore, error rates during read operations can be reduced. The lower shield 3450 is preferably formed of a material with high saturation magnetic flux density such as NiFe (Permalloy) or an iron alloy as the main magnetic pole 3400 is formed of.

Referring also to FIG. 5, laser light 53a, the spot size of which the spot-size converter 43 changes (reduces), enters the waveguide 35 from the light-receiving end surface 352, and propagates through the waveguide 35. The waveguide 35 extends from the light-receiving end surface 352 to the end surface 350 on the head end surface 2210 side through the through-hole that is provided in the back contact portion 3402 and extends in X-axis direction. Furthermore, the NF-light generator 36 is a generator that transforms the laser light (waveguide light) propagating through the waveguide 35 into NF-light. A part on the head end surface 2210 side of the waveguide 35 and the NF-light generator 36 are provided between the lower shield 3450 (lower yoke layer 345) and the main magnetic pole 3400 (upper yoke layer 340). Further, a portion of the upper surface (side surface) of the waveguide 35 on the head end surface 2210 side is opposed to a portion of the lower surface (including a propagative edge 360 (FIG. 6)) of the NF-light generator 36 with a predetermined distance. The sandwiched portion between these portions constitutes a buffering portion 50 having a refractive index lower than that of the waveguide 35. The buffering portion 50 acts for coupling the laser light (waveguide light) that propagates through the waveguide 35 with the NF-light generator 36. A detailed explanation of the waveguide 35, the buffering portion 50 and the NF-light generator 36 will be given later with reference to FIG. 6.

Further, also as shown in FIG. 5, an inter-element shield layer 39 is preferably provided between the MR element 33 and the electromagnetic transducer 34 (lower yoke layer 345), sandwiched by the insulating layers 382 and 383. The inter-element shield layer 39 plays a role for shielding the MR element 33 from the magnetic field generated from the electromagnetic transducer 34, and may be formed of a soft-magnetic material. Here, the above-described insulating layers 381, 382, 383, 384, 385 and 386 constitute the overcoat layer 38.

Figure 6:
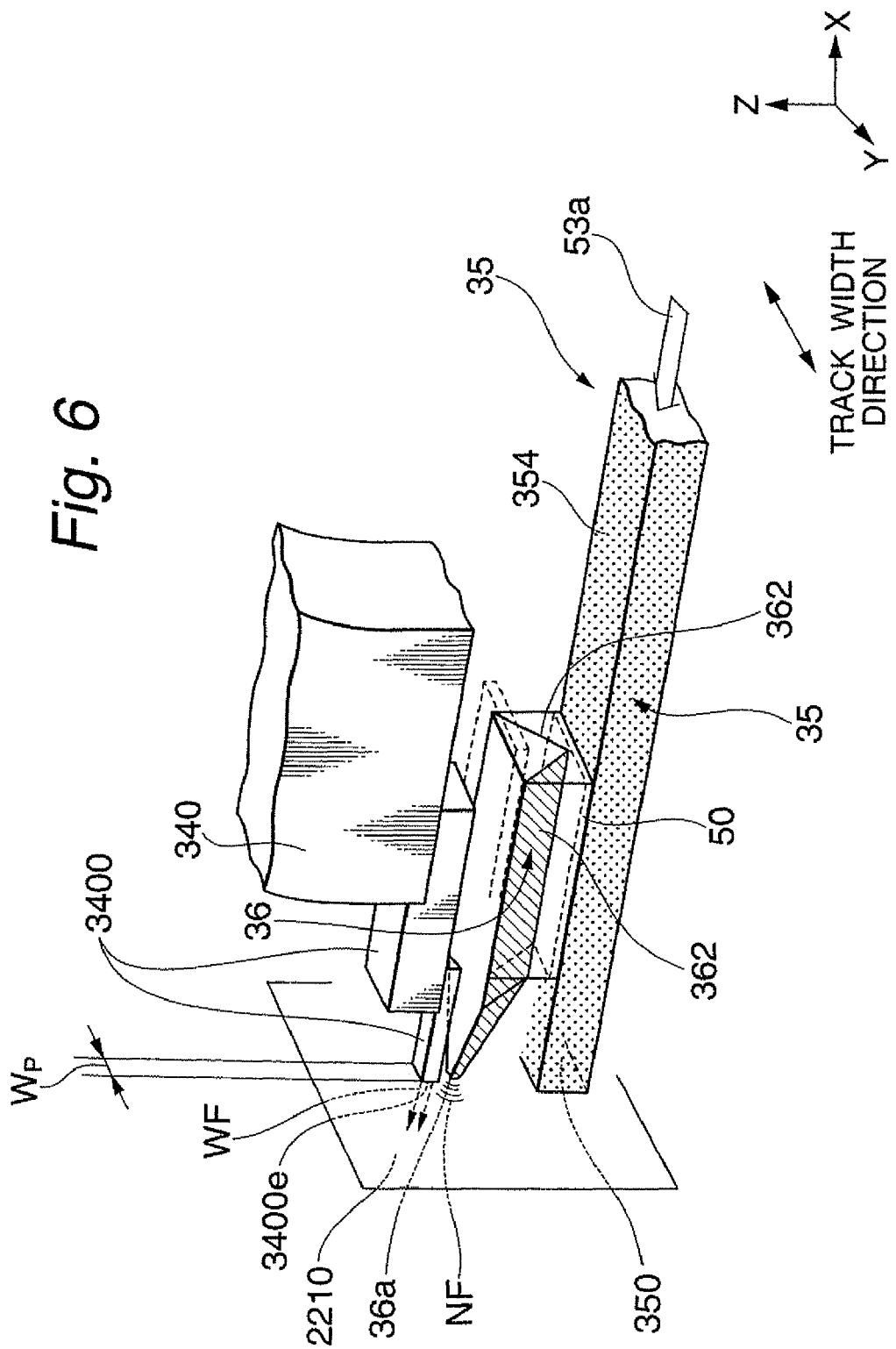
FIG. 6 shows a perspective view schematically illustrating the configuration of a waveguide, a near-field light (NF-light) generator and a main magnetic pole.

FIG. 6 shows a perspective view schematically illustrating the configuration of the waveguide 35, the NF-light generator 36 and the main magnetic pole 3400. In the figure, the head end surface 2210 is positioned at the left side, the surface 2210 including positions where write field and NF-light are emitted toward the magnetic recording medium.

As shown in FIG. 6, the configuration includes a waveguide 35 for propagating laser light (waveguide light) 53b used for generating NF-light toward the end surface 350, and ae NF-light generator 36 that receives the waveguide light 53b and generates NF-light NF. Here, the waveguide 35 is formed of a material with a refractive index n higher than the refractive index $n_{OC}$ of the constituent material of the overcoat layer 38. This material design causes the waveguide 35 to act as a core, and causes the overcoat layer 38 to act as a clad. For example, in the case that the wavelength $\lambda_L$ of the laser light is 600 nm and the overcoat layer 38 is formed of $Al_2O_3$ (n=1.63), the waveguide 35 can be formed of, for example, $SiO_xN_y$ (n=1.7-1.85) or $Ta_2O_5$ (n=2.16). Further, a portion sandwiched between a portion of the side surface 354 of the waveguide 35 and a portion of the lower surface 362 of the NF-light generator 36 constitutes a buffering portion 50. The buffering portion 50 is formed of a dielectric material having a refractive index lower than the refractive index of the waveguide 35, and plays a role of coupling the waveguide light 53a with the NF-light generator 36. For example, when the wavelength $\lambda_L$ of the laser light is 600 nm and the waveguide 35 is formed of TaOx (n=2.16), the buffering portion 50 can be formed of $SiO_2$ (n=1.46) or $Al_2O_3$ (n=1.63). In the light source and optical system as shown in FIGS. 3, 5 and 6, the laser light emitted from the light-emission center 4000 of the laser diode 40 preferably has TM-mode polarization in which the oscillation direction of electric field of the laser light is along Z-axis.

The optical system that is provided in the head element part 221 and generates light for thermal assist is not limited to the above-described one. For example, as an alternative, there can be available an optical system that use a NF-light generator having another shape and structure, or an optical system in which a plasmon antenna made of a metal piece is provided at the end of a waveguide.

Figure 7A:
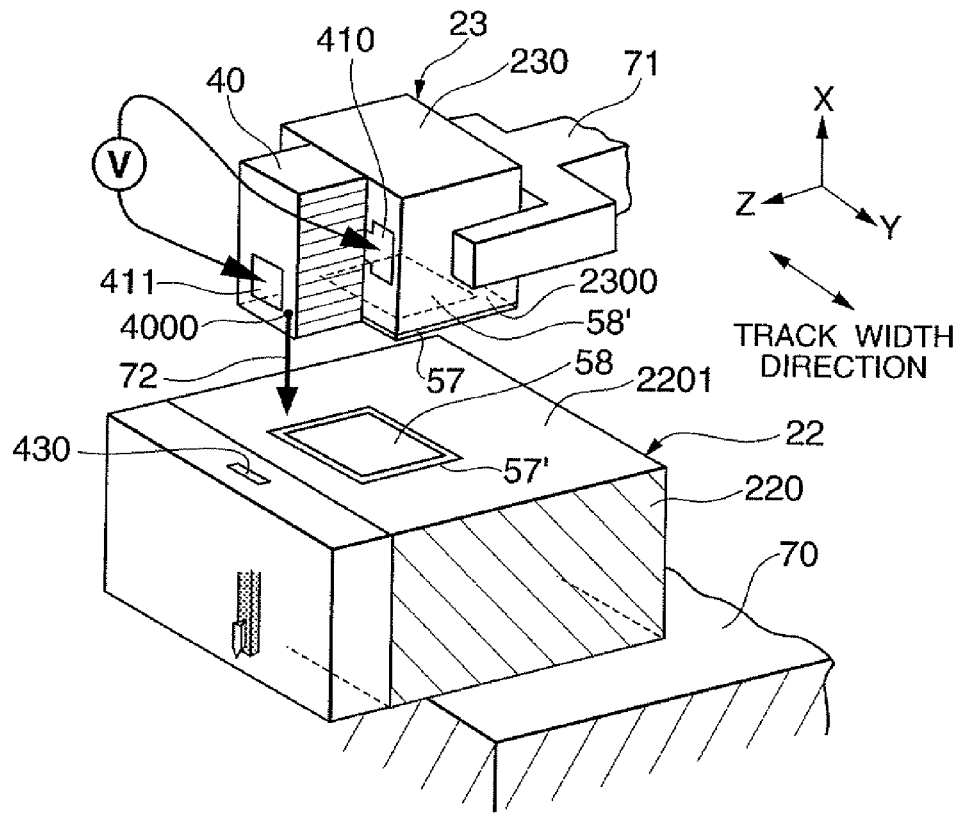
FIGS. 7a to 7c show perspective views schematically illustrating an embodiment of a method for manufacturing the thermally-assisted magnetic recording head according to the present invention, in which a light source unit is joined to a slider.
Figure 7B:
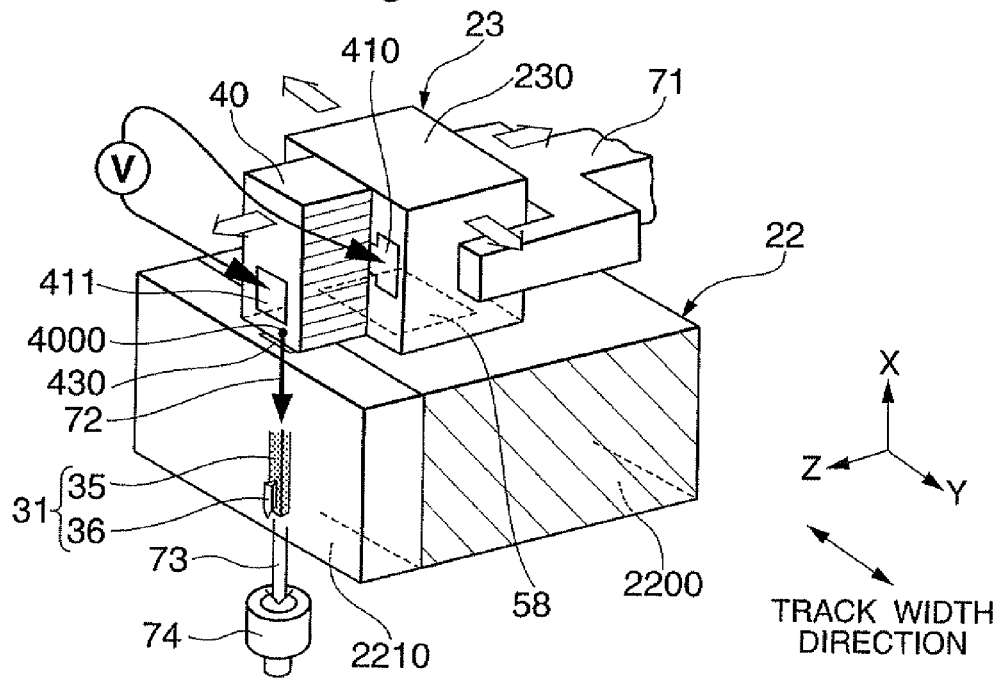
Figure 7C:
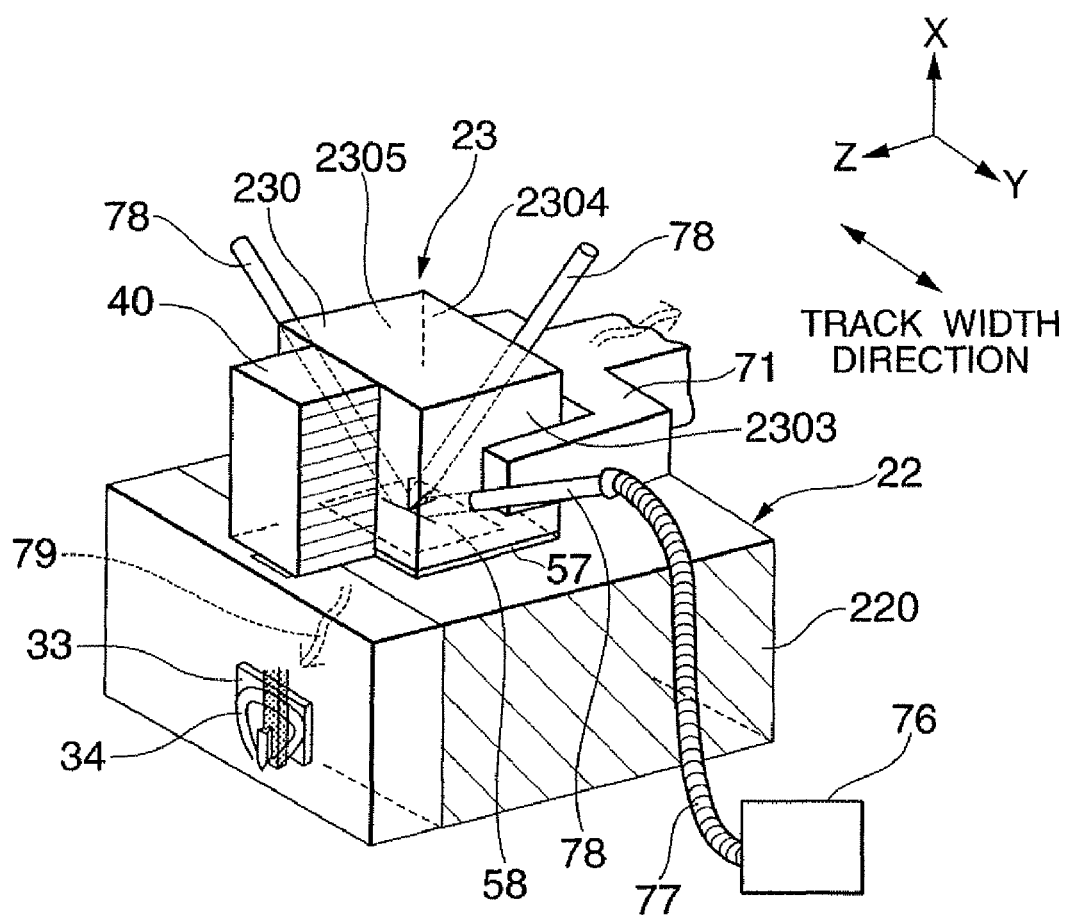

FIGS. 7a to 7c show perspective views schematically illustrating an embodiment of a method for manufacturing the thermally-assisted magnetic recording head 21 according to the present invention, in which the light source unit 23 is joined to the slider 22.

As illustrated in FIG. 7a, first a solder layer 58 is formed on the back surface 2201 of the slider 22 by a method such as vapor deposition. The solder layer 58 is a unit adhesion material layer for joining the light source unit 23 to the slider 22. As has been described above, the solder layer 58 is preferably made of an alloy having a melting point lower than 400° C., more preferably lower than or equal to 250° C. The material of the solder layer 58 that has a melting point lower than or equal to 250° C. may be Sn (tin), an Sn alloy, a Pb (lead) alloy, or a Bi (bismuth) alloy, which is selected from the group consisting of Sn, SnAu, SnCu, SnAl, SnSi, SnGe, SnMg, SnPb, SnAg, SnZn, SnBi, SnNi, SnPt, PbAu, PbMg, PbBi and BiAu.

The solder layer 58, which is a unit adhesion material layer, is preferably made of a material having a melting point lower than the solder layer 52 (FIG. 4), which is a light-source adhesion material layer used for joining the laser diode 40 to the unit electrode 4100 provided on the unit substrate 230. The solder layer 58 is more preferably made of a material having a melting point lower than the solder layer 52 by 30° C. or more. For example, if the solder layer 52 is made of an AuSn alloy (containing 80 weight % of Au), the melting point of the solder layer 52 will be in the range of approximately 280 to 300° C. The Sn, Sn alloy, Pb alloy, and Bi alloy given above have melting points at the eutectic composition (eutectic points) lower than or equal to 250° C., which is lower than the melting point of the solder layer 52 by 30° C. or more. That is, any of these Sn, Sn alloy, Pb alloy and Bi alloy is significantly preferable as the material of the solder layer 58.

A solder layer 58' may be formed on the joining surface 2300 of the light source unit 23 as a unit adhesion material layer. Alternatively, the solder layers 58 and 58' may be provided on the slider 22 and the light source unit 23, respectively. As has been described with respect to FIG. 3, preferably a reflective layer 57 is provided on the joining surface 2300 of the unit substrate 230. The reflective layer 57 reflects light 78 (FIG. 7c) such as Nd-YAG laser light that is used in joining the light source unit 23 to the slider 22 and is propagating through the unit substrate 230 so that a sufficient amount of the light 78 is absorbed into the unit substrate 230. The reflective layer 57 may be a layer of a metal, such as Au, Al, an Au alloy, or an Al alloy, which has a high reflectivity, has a thickness of approximately 0.05 to 1 μm, for example, and is formed on a foundation layer made of a material such as Ta or Ti having a thickness of approximately 1 to 10 nm. If the solder layer 58' is provided, the reflective layer 57 and the solder layer 58' will be formed on the joining surface 2300 in sequence. It is also preferable that a foundation layer of a material such as Ta or Ti having a thickness of approximately 1 to 10 nm, for example, and an adhesion layer 57' of a material such as Au, Al, an Au alloy, or an Al alloy having a thickness of approximately 5 to 20 nm, for example, are formed on the back surface 2201 of the slider substrate 220. In this case, the solder layer 58 is formed on the adhesion layer 57'.

Then, the slider 22 is placed on a stage 70 of an alignment system and the light source unit 23 is attached to a holding jig 71 of the alignment system in such a manner that the joining surface 2300 of the unit substrate 230 is opposed to the back surface 2201 of the slider substrate 220. The positioning of the holding jig 71 can be controlled in relation to the stage 70 with desired accuracy, for example, an accuracy of ±1 μm or higher in Y-axis and Z-axis directions. Then a predetermined voltage is applied between terminal electrodes 410 and 411 of the laser diode 40 provided on the light source unit 23 to activate the laser diode 40 and to cause the laser diode 40 to emit laser light 72 from its light-emission center 4000. Here, the light source unit 23 and the slider 22 are at a predetermined distance away from each other in X-axis direction and are movable in Y-axis direction (the track width direction) and Z-axis direction.

In the present embodiment, as illustrated in FIG. 7b, while the light source unit 23 and the slider 22 are moved in Y-axis and Z-axis directions with respect to each other, the laser diode 40 is actually kept operating, and laser light 72 being emitted from the light-emission center 4000 is monitored in real time by a photodetector 74 provided on the head end surface 2210 side to perform alignment. That is, the so-called active alignment method, which can achieve high alignment accuracy, is used to align the light source unit 23 with the slider 22. Specifically, laser light 72 emitted from the light-emission center 4000 of the light source unit 23 is incident on the optical system 31 through the light-receiving end surface 430 of the slider 22 and is detected by the photodetector 74 as light 73 emitted from the end surface 350 (FIG. 6) of the waveguide 35 or from the end surface 36a (FIG. 6) of the NF-light generator 36. The photodetector 74 is disposed in such a manner that its light-receiving surface faces the end surface 350 or 36a. Here, the position of the slider 22 and the light source unit 23 at the time the largest monitor output is obtained from the photodetector 74 is determined to be the alignment completion position in YZ plane, the largest monitor output indicating that the largest amount of laser light 72 is incident on the light-receiving end surface 430.

Then, as shown in FIG. 7c, the holding jig 71 is brought close to the stage 70 to reduce the distance between the light source unit 23 and the slider 22 in X-axis direction without changing the determined relative positions of the light source unit 23 and the slider 22 in YZ-plane, until the light source unit 23 contacts the slider 22, thereby determining the relative positions of the light source unit 23 and the slider 22. Here, the solder layer 58 (solder layer 58') is sandwiched between the light source unit 23 and the slider 22. Then the unit substrate 230 is irradiated with light 78 with a predetermined wavelength that passes the unit substrate 230, causing the light 78 to enter the unit substrate 230. The light 78 entering the unit substrate 230 heats the unit substrate 230. In doing so, heat generated in the unit substrate 230 and the light 78 that reached the reflective layer 57 and the solder layer 58 (58') melt the solder layer 58 (58'). The solder layer 58 (58') then solidifies. Thus the light source unit 23 is joined to the slider 22.

Here, if the reflective layer 57 is provided, light 78 propagating through the unit substrate 230 is reflected by the reflective layer 57. In consequence, the light path of the light 78 in the unit substrate 230 is lengthened and a sufficient amount of light 78 is absorbed into the material of the unit substrate 230. Accordingly, the unit substrate 230, especially the portion near the joining surface 2300 of the unit substrate 230 is wholly heated to a sufficiently high temperature. Consequently, the entire solder layer (58') under the joining surface 2300 is sufficiently melted and better joining can be achieved. The reflective layer 57 also acts as an adhesion layer that increases the wettability of the light source unit 23 to the solder layer 58.

The light 78 can be Nd-YAG laser light (which has a wavelength of 1064 nm) emitted from an Nd-YAG laser oscillator 76 through an optical fiber 77. Here, YAG is the name of a crystal having a garnet structure, made of a composite oxide ($Y_3Al_5O_{12}$) of Y (yttrium) and Al (aluminum). Nd-YAG laser light can be obtained by using a YAG crystal in which a several percent of Y is replaced with Nd (neodymium) as the laser medium. The Nd-YAG laser light is widely used in research, industrial, medical and other applications. If Nd-YAG laser light is used as the light 78, the unit substrate 230 is made from a material that has a transmittance higher than or equal to 50% at a wavelength of 1064 nm, such as Si (transmittance: 67%), GaAs (transmittance: 66%), or SiC (transmittance: 80%) so that the solder layer 58 (solder layer 58') can be irradiated with a sufficient amount of light 78 for melting which passes through the unit substrate 230. The light 78 may be other type of laser light such as YAG laser light other than Nd-YAG laser light, solid-state laser light other than YAG laser light, or gas laser light such as carbon dioxide gas laser light. In all cases, light that has a wavelength that can pass through the unit substrate 230 and has output power required for melting the solder layer 58 (solder layer 58') is used; or a material that can pass the wavelength of light used is used to form the unit substrate 230.

Further, using the active alignment method to align the light source unit 23 and the slider 22 with respect to each other can reduce the output power or the irradiation time required for melting of the light 78. According to the active alignment method, the laser diode 40 is kept operating and radiating considerable heat during the alignment process until irradiation with the light 78, as stated above. The solder layer 58 (solder layer 58') has already been heated by the heat to a temperature significantly higher than room temperature even just before the irradiation with the light 78. That is, the active alignment method can assist melting the solder layer 58 (58') by the light 78.

The light 78 is preferably emitted to at least one of side surfaces 2303, 2304 and 2305 of the unit substrate 230 that are adjacent to the joining surface 2300. This prevents the light 78 from hitting the slider substrate 220 to heat the slider substrate 220 before the light 78 reaches the solder layer 58 (58'). Furthermore, the slider substrate 220 is preferably made of a material that has a lower thermal conductivity than the material of the unit substrate 230. For example, if the unit substrate 230 is made of Si (thermal conductivity: 168 W/(m·K)), the slider substrate 220 is preferably made of a material such as AlTiC ($Al_2O_3$—TiC) (thermal conductivity: 19.0 W/(m·K)) or $SiO_2$ (thermal conductivity: 10.7 W/(m·K)). In the slider 22, there is provided a magnetic head element 32 including an MR element 33 and an electromagnetic transducer 34. If these elements are heated to temperatures higher than 200° C., for example, by heat 79 from the solder layer 58 (58'), the MR multilayer 322 of the MR element 33 (FIG. 5) tends to degrade, or the main magnetic pole 3400, the lower shield 3450 (FIG. 5) or the like of the electromagnetic transducer 34 tends to thermally expand to protrude to an undesirable extent, which can result in defects. However, if the conditions of irradiation direction and thermal conductivity described above are satisfied, excessive heating of the slider substrate 220 by irradiation with the light 78 is avoided, and the amount of heat conducted to the slider substrate 220 out of the amount of heat generated from the solder layer 58 (58') and the unit substrate 230 can be reduced. Consequently, adverse influence of heat on the MR element 33 and the electromagnetic transducer 34 can be suppressed.

It is also preferable that heat generated from the solder layer 58 (58') and the unit substrate 230 by irradiation of the light 78 is dissipated to the outside world through the holding jig 71 holding the light source unit 23. The laser diode 40 provided in the light source unit 23 usually does not degrade on exposure to a high temperature on the order of 400° C., for example. However, in order to avoid excessive heating of the laser diode 40 and the magnetic head element 32 described above, the holding jig 71 is preferably made of a material such as a metal that has a high thermal conductivity so that the holding jig 71 functions as a heatsink during irradiation with light 78. It should be noted that the heat dissipation by the holding jig 71 is adjusted so that the solder layer 58 (58') sufficiently melts by the irradiation with light 78 and the assistance of heat from the laser diode 40.

Figure 8A:
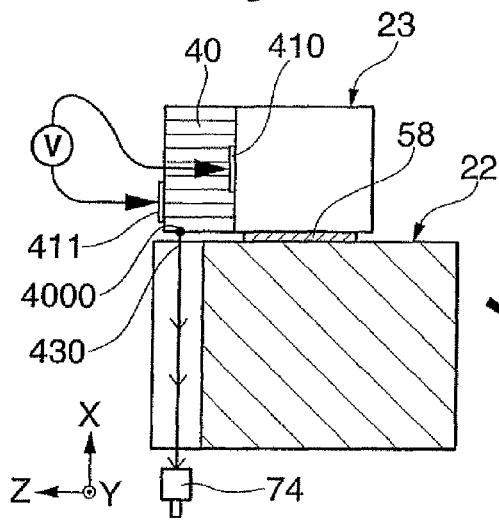
FIGS. 8a to 8c show perspective views schematically illustrating another embodiment of the method for manufacturing the thermally-assisted magnetic recording head according to the present invention, in which a light source unit and a slider are joined with each other.
Figure 8B:
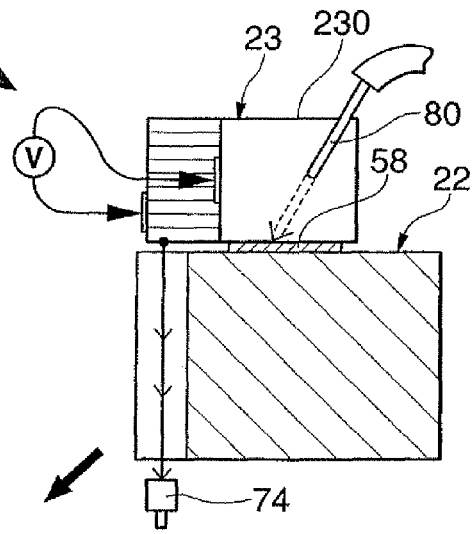
Figure 8C:
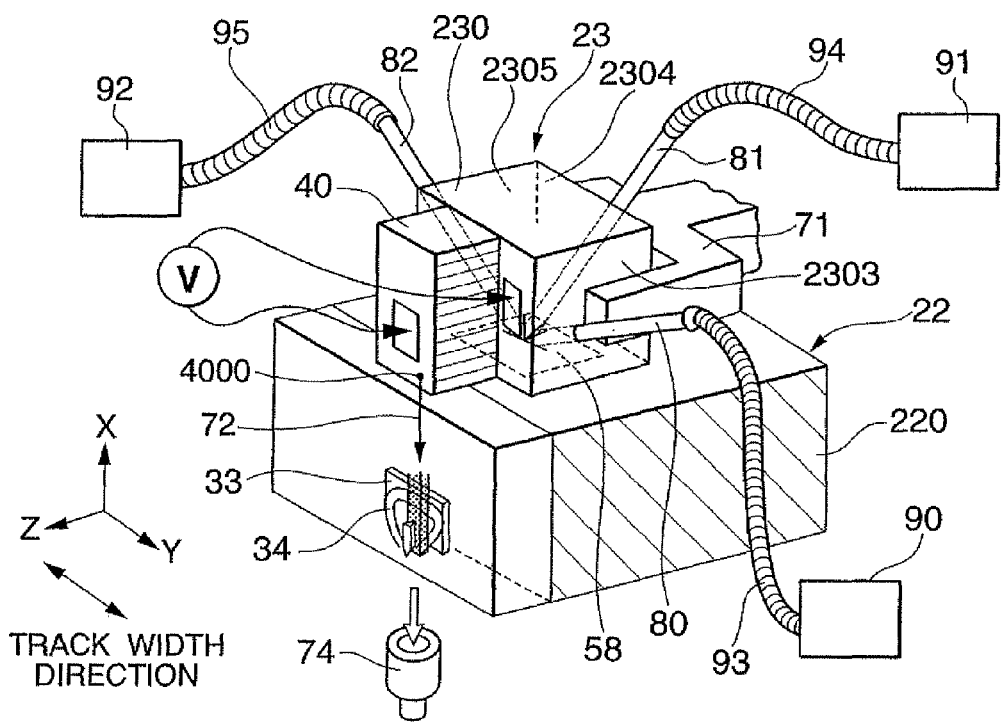

FIGS. 8a to 8c show perspective views schematically illustrating another embodiment of the method for manufacturing the thermally-assisted magnetic recording head 21 according to the present invention, in which the light source unit 23 and the slider 22 are joined with each other.

Referring to FIG. 8a, first the active alignment method is used to align the light source unit 23 and the slider 22 with each other as described with reference to FIGS. 7a and 7b, to determine the positions of the light source unit 23 and the slider 22 with a solder layer 58 sandwiched between them. Then, as shown in FIG. 8b, the solder layer 58 is irradiated with light 80 such as Nd-YAG laser light through the unit substrate 230 to melt and solidify the solder layer 58 to bond the light source unit 23 and the slider 22 together as described with reference to FIG. 7c.

Here, depending on the conditions of irradiation with the light 80 and the position and state of the solder layer 58, the solder layer 58 can be partially melted by the light 80, the rates of melting can vary from location to location, or the rates of solidification after the melting can differ from location to location. Such variations can generate a force that moves the light source unit 23 and the slider 22. Further, depending on the degree of the force, the light source unit 23 and the slider 22 which have been aligned can be displaced with respect to each other after irradiation with light 80.

In order to resolve such displacement, multiple Nd-YAG laser oscillators 90, 91 and 92 are provided beforehand as illustrated in FIG. 8c, and the radiation apertures of optical fibers 93, 94 and 95 are arranged in such a way that the solder layer 58 can be irradiated with beams of light 80, 81 and 82 from different directions. Then, the amount of displacement of the light source unit 23 and the slider 22 with respect to each other is obtained beforehand in the case that the solder layer 58 is irradiated with a predetermined one shot (pulse) of each of the beams of light 80, 81 and 82. Then, the laser diode 40 is actually activated and laser light 72 emitted from the light-emission center 4000 is monitored in real time by a photodetector 74 provided on the head end surface 2210 side while the Nd-YAG laser oscillators 91, 91 and 92 are activated as appropriate to irradiate the solder layer 58 with an appropriate number of shots of each light beams 80, 81 and 82. In the irradiation, the appropriate number of shots of each light beams 80, 81 and 82 is made by taking into consideration the amount of displacement caused by the predetermined one shot of each light beam 80, 81 and 82, so that the maximum monitor output is provided from the photodetector 74, thereby correcting the positions.

According to the method described above, alignment using the active alignment method can be accomplished with high accuracy while irradiating the solder layer 58 with light beams 80, 81 and 82 from different directions to repeatedly melt the solder layer 58. Consequently, variations in relative positions of the light source unit 23 and the slider 22 caused by melting of the solder layer 58 can be corrected to ensure reliable bonding of the light source unit 23 and the slider 22 in a desired position.

The method does not necessarily need multiple Nd-YAG laser oscillators. For example, an optical switch may be provided so that a single Nd-YAG laser oscillator 90 can provide laser light into any of the optical fibers 93, 94 and 95. Alternatively, a set of Nd-YAG laser oscillator 90 and optical fiber 93 may be moved as appropriate to provide light beams 80, 81 and 82 from different directions. Furthermore, the number of light beams from different directions for melting the solder layer 58 is not limited to three; two or more than three light beams may be used.

(Practical Examples of Joining)

Practical examples of joining between a light source unit 23 and a slider 22 according to the present invention will be described below.

In the practical examples, a light source unit 23 including a unit substrate 230 made of Si (silicon) was joined to a slider 22 including a slider substrate 220 made of AlTiC (Al$_2$O$_3$—TiC) by using circularly-polarized Nd-YAG laser light 78 with a wavelength λ of 1064 nm. A solder layer 58 was made of Sn (with a melting point of 231° C.) or an AuSn alloy (containing 80 weight % of Au and having a melting point in the range of approximately 280 to 300° C.) and provided in the back surface 2201 of the slider substrate 220. A 5-nm-thick foundation layer of Ta and a 100-nm-thick reflective layer 57 of Au were provided in the joining surface 2300 of the unit substrate 230.

Output power of the Nd-YAG laser light 78 was 0.7 kW and the irradiation time was 3, 4 or 5 msec (milliseconds). The spot diameter of the laser light 78 was adjusted with an aperture to 50 μm. Under these conditions, side surfaces 2303 and 2305 (FIG. 7c) of the unit substrate 230 are irradiated with the Nd-YAG laser light 78. That is, the laser light 78 was applied from two directions: the side surface 2303's side and the side surface 2305's side.

Shearing forces that are parallel to the back surface 2201 (YZ-plane) and parallel to each other but opposite in direction were applied to the light source unit 23 and the slider 22 joined together under the conditions described above to remove the light source unit 23 from the slider 22. In doing so, the smallest shearing force $f_S$ required for the removal was measured.

Table 1 gives the smallest shearing forces $f_S$ for samples that had a solder layer 58 made of Sn or an AuSn alloy (containing 80 weight % of Au) and were joined under irradiation for 3, 4 or 5 msec.

TABLE 1

| Irradiation time (msec) | | 3 | 4 | 5 |
|---|---|---|---|---|
| Smallest shearing force $f_s$ (gf) | Sn | 200 | 260 | 220 |
| | AuSn | | 30 | 250 |

Referring to Table 1, the smallest shearing forces $f_S$ for the solder layers 58 made of Sn (with a melting point 231° C.) irradiated with Nd-YAG laser light 78 for 3, 4 and 5 msec are greater than or equal to 200 grams-force (gf), which is sufficiently large. Therefore it will be understood that a sufficiently high strength of joining between the light source unit 23 and the slider 22 has been achieved by using the solder layer 58 made of Sn which has a melting point of less than or equal to 250° C., which is sufficiently low. On the other hand, in the case of the solder layer 58 made of an AuSn alloy (containing 80 weight % of Au and having a melting point in the range of approximately 280 to 300° C.) and irradiated with Nd-YAG laser light 78 for 5 msec, the smallest shearing force $f_S$ is greater than 200 gf, which is sufficiently large. However, in the case of the solder layer 58 of the AuSn alloy irradiated for only 4 msec, the smallest shearing force $f_S$ is only 30 gf, which can mean an insufficient joining force.

A longer irradiation time with the Nd-YAG laser light 78 can adversely affect the joining between the unit substrate 230 and the laser diode 40 with the solder layer 52. For example, if both of the solder layers 52 and 58 are made of an AuSn alloy (containing 80 weight % of Au), the solder layer 52 will melt under the influence of a temperature of the order of 280 to 300° C. at which the solder layer 58 melts. On the other hand, if the solder layer 52 is made of an AuSn alloy (containing 80 weight % of Au) and the solder layer 58 is made of Sn, the solder layer 52 does not melt at 231° C. at which the solder layer 58 melts. Accordingly, good joining between the unit substrate 230 and the laser diode 40 can be maintained. It will be understood from the foregoing that it is more preferable that the solder layer 58 be made of Sn, which has a lower melting point of 250° C. or lower.

(Effect of Polarization of Light 78)

If a reflective layer 57 is provided on the joining surface 2300 of the unit substrate 230 as illustrated in FIGS. 3, 7a and 7c, most of the light 78 incident on the unit substrate 230 and propagating through the unit substrate 230 toward the joining surface 2300 is reflected by the reflective layer 57, and therefore the solder layer 58 is practically not directly heated. In practice, if the unit substrate 230 is made of Si and the light 78 propagating through the unit substrate 230 is Nd-YAG laser light, the energy of the Nd-YAG laser light 78 is absorbed into the unit substrate 230 (Si) with a loss of approximately 5 dB/cm. Heat equivalent to the absorbed energy increases the temperature of the unit substrate 230. As a result, the solder layer 58 is heated and melts. The degree of absorption varies depending on the polarization of Nd-YAG laser light 78 as well as the incident angle of the Nd-YAG laser light 78 to the unit substrate 230. An example is given below in which the effect of polarization of Nd-YAG laser light 78 on absorption was studied in simulation.

FIG. 9 shows a schematic view illustrating an experimental system used in the simulation for studying the effect of polarization of Nd-YAG laser light 78 on absorption of the Nd-YAG laser light 78 into the unit substrate 230.

As shown in FIG. 9, a 5-nm-thick foundation layer 570 of Ta and a 100-nm-thick reflective layer 57 of Au were formed in sequence on the joining surface 2300 of the unit substrate 230. A 5-nm-thick foundation layer 570' of Ta, a 10-nm-thick adhesion layer 57' of Au, and a 300-nm-thick solder layer 58 of Sn, which was a unit adhesion material layer, were formed in sequence on the back surface 2201 of the slider substrate 220. The unit substrate 230 was placed in contact with the slider substrate 220 in such a manner that the surface of the reflective layer 57 and the surface of the solder layer 58 are joined together.

It was assumed that the side surface 2305 of the unit substrate 230 in contact with the slider substrate 220 was irradiated with Nd-YAG laser light 78 while the opposite side surface 2303 was irradiated with Nd-YAG laser light 78' so that the laser lights 78 and 78' entered the unit substrate 230 from two directions. In the respective cases that the Nd-YAG laser light 78, which was one of the irradiated laser lights, was S-polarized and was P-polarized, the amount that was absorbed into the reflective layer 57, the solder layer 58 and the surrounding metal layers and the amount that was absorbed into the unit substrate 230 were calculated in the Nd-YAG laser light 78 propagating through the unit substrate 230.

Here, it was assumed that the unit substrate 230 was made of Si. The width $W_{UN}$ of the unit substrate 230 along Y-axis direction (the track width direction) was 500 µm. The Nd-YAG laser light 78 was incident on the side surface 2305 of the unit substrate 230 at an incident angle of 45° (degrees) through air (with a refractive index n=1). The incident position was at a distance of $d_{IN}$=100 µm from the joining surface 2300 in X-axis direction. The light path length (in Region 1) of the Nd-YAG laser light 78 propagating through the unit substrate 230 to the joining surface 2300 was 495 µm, and the light path length (in Region 2) of the Nd-YAG laser light 78 reflected by the joining surface 2300 (the reflective layer 57) was 16 µm (the total light path length was 511 µm).

Based on 100 (%) of the amount $P_{ALL}$ of the Nd-YAG laser light 78 before entering the unit substrate 230, the amount $P_1$ of laser light 78 immediately after entering the unit substrate 230 and the amount $Ab_1$ of laser light 78 absorbed into the unit substrate 230 (in Region 1) until the laser light 78 reached the joining surface 2300 (the reflective layer 57, the solder layer 58 and the surrounding metal layers) were calculated to obtain the amount $Ab_m$ of laser light 78 absorbed in the reflective layer 57, the solder layer 58 and the surrounding metal layers. Here, the reflectivity of the reflective layer 57 was 98%.

Furthermore, the amount $P_2$ of Nd-YAG laser light 78 immediately after being reflected by the reflective layer 57, the amount $Ab_2$ of laser light 78 absorbed in the unit substrate 230 (in Region 2) until the laser light 78 reached the side surface 2030, and the amount $P_3$ of laser light 78 radiated through the side surface 2030 to the outside were calculated to obtain the amount ($Ab_1+Ab_2$) of laser light 78 ultimately absorbed into the unit substrate 230.

Table 2 lists the calculated amounts $Ab_m$ of Nd-YAG laser light 78 absorbed into the reflective layer 57, the solder layer 58 and the surrounding metal layers and the calculated amounts ($Ab_1+Ab_2$) of Nd-YAG laser light 78 absorbed into the unit substrate 230. In the table, S-polarized Nd-YAG laser light 78 is a light whose electric field oscillates perpendicularly to the incident plane (XY-plane in FIG. 9) (in Z-axis direction) whereas the P-polarized Nd-YAG laser light 78 is a light whose electric field oscillates in the incident plane (XY-plane in FIG. 9).

TABLE 2

|  |  | $P_{ALL}$ | $P_1$ | $Ab_1$ | $Ab_m$ |
|---|---|---|---|---|---|
| Light amount (%) | S-polarized | 100 | 56.7 | 3.1 | 1.1 |
|  | P-polarized | 100 | 81.3 | 4.5 | 1.5 |

|  |  | $P_2$ | $Ab_2$ | $P_3$ | $Ab_1 + Ab_2$ |
|---|---|---|---|---|---|
| Light amount (%) | S-polarized | 52.5 | 0.1 | 35.8 | 3.2 |
|  | P-polarized | 75.2 | 0.1 | 52.5 | 4.6 |

Referring to Table 2, the amount $Ab_m$ of S-polarized Nd-YAG laser light 78 absorbed into the reflective layer 57, the solder layer 58 and the surrounding metal layers is 1.1% whereas the amount $Ab_m$ of P-polarized Nd-YAG laser light 78 is 1.5%. That is, the amount of P-polarized Nd-YAG laser light 78 absorbed in the solder layer 58 is greater than that of the S-polarized Nd-YAG laser light 78 by a factor of approximately 1.4. Further, the amount ($Ab_1+Ab_2$) of S-polarized beam Nd-YAG laser light 78 absorbed into the unit substrate 230 is 3.2% whereas the amount ($Ab_1+Ab_2$) of P-polarized Nd-YAG laser light 78 absorbed in the unit substrate 230 is 4.6%. That is, the amount of P-polarized Nd-YAG laser light 78 absorbed in the unit substrate 230 is greater than that of S-polarized Nd-YAG laser light 78 by a factor of approximately 1.4.

In general, the reflectivity of a P-polarized light entering a transparent material such as glass through air is lower than the reflectivity of an S-polarized light. The results listed in Table 2 show that the P-polarized Nd-YAG laser light 78 is more absorbed into the unit substrate 230 and the solder layer 58 and consequently melts the solder layer 58 more efficiently than the S-polarized Nd-YAG laser light 78. In this case, less output power of laser light is required during joining and, in consequence, the laser oscillator can be reduced in size and cost. Therefore a P-polarized light is preferable as the light 78 used in joining the light source unit 23 to the slider 22. In an actual manufacturing process, the plane of polarization can become out of alignment because of maladjustments or errors in jigs used for adjusting polarization. Therefore, preferably circularly- or elliptically-polarized light 78, which includes a sufficient amount of P-component, is used.

According to the present invention, since the unit adhesion material layer (solder layer or layers 58, 58') can be melted using light such as YAG laser light in joining the light source unit 23 to the slider 22 as has been described above, high alignment accuracy can be achieved while a joint that has a higher joining strength and is less prone to deterioration with time can be provided. Furthermore, the use of a unit adhesion material layer made of Sn or an Sn alloy, a Pb alloy or a Bi alloy enables joining that does not adversely affect the joining between the unit substrate 230 and a light source such as the laser diode 40 by a light-source adhesion material layer (solder layer 52). Since the unit adhesion material layer (solder layer or layers 58, 58') is melted by irradiation on the unit substrate 230 with light such as YAG laser light, adverse influence of heat generated by the irradiation on the magnetic head element 32 in the slider 22 can be avoided.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A method for manufacturing a thermally-assisted magnetic recording head in which a light source unit including a light source provided in a unit substrate and a slider including an optical system provided in a slider substrate are joined with each other, wherein the unit substrate is made of a material transmitting light having a predetermined wavelength and a unit adhesion material layer is formed on a surface of one or each of the light source unit and the slider, the unit adhesion material layer containing a material selected from a group consisting of tin, tin alloy, lead alloy and bismuth alloy, the manufacturing method comprising the steps of:
aligning the light source unit and the slider with each other in such a way that a light generated from the light source can enter the optical system and the unit adhesion material layer is sandwiched between the light source unit and the slider;

causing a light including the predetermined wavelength to enter the unit substrate to melt the unit adhesion material layer; and bonding the light source unit and the slider with each other.

2. The manufacturing method as claimed in claim 1, wherein the unit adhesion material layer contains a material selected from a group consisting of Sn, SnAu, SnCu, SnAl, SnSi, SnGe, SnMg, SnPb, SnAg, SnZn, SnBi, SnNi, SnPt, PbAu, PbMg, PbBi and BiAu.

3. The manufacturing method as claimed in claim 1, wherein the unit adhesion material layer is made of a material having a melting point lower than a melting point of a light-source adhesion material layer used for joining the light source to an electrode provided on the unit substrate.

4. The manufacturing method as claimed in claim 3, wherein the unit adhesion material layer is made of a material having a melting point lower, by 30° C. or more, than a melting point of a light-source adhesion material layer used for joining the light source to an electrode provided on the unit substrate.

5. The manufacturing method as claimed in claim 1, wherein a reflective layer is provided on a surface of the unit substrate opposed to the slider substrate when joined to the slider, the reflective layer reflecting the light including the predetermined wavelength.

6. The manufacturing method as claimed in claim 1, wherein the light source is activated, and the light source unit and the slider are aligned in such a way that the light generated from the light source enters the optical system.

7. The manufacturing method as claimed in claim 6, wherein the melting of the unit adhesion material layer by the entering of the light including the predetermined wavelength is assisted by heating the unit adhesion material layer to a high temperature with a heat generated from the activated light source.

8. The manufacturing method as claimed in claim 6, wherein the unit adhesion material layer is repeatedly melted by causing the lights including the predetermined wavelength to enter the unit substrate from different directions, to correct variations in relative positions of the light source unit and the slider caused by the melting of the unit adhesion material layer.

9. The manufacturing method as claimed in claim 8, wherein the amount of displacement of the light source unit and the slider with respect to each other is obtained beforehand in the case that the unit adhesion material layer is irradiated with a predetermined one shot of each of the lights from different directions, then the number of shots of each of the lights from different directions is determined.

10. The manufacturing method as claimed in claim 1, wherein the slider comprises a magnetic head element configured to write and/or read data, and the slider substrate is made of a material having a lower thermal conductivity than a material of the unit substrate so that conduction of a heat generated by the entering of the light including the predetermined wavelength to the magnetic head element is limited.

11. The manufacturing method as claimed in claim 10, wherein, during the alignment, a holding means to hold the light source unit is used as a heatsink for the heat generated by the entering of the light including the predetermined wavelength.

12. The manufacturing method as claimed in claim 1, wherein the unit substrate is made of a material selected from a group consisting of Si, GaAs and SiC, and a YAG laser light is used as the light including the predetermined wavelength.

13. The manufacturing method as claimed in claim 1, wherein a circularly- or elliptically-polarized light is used as the light including the predetermined wavelength.

14. The manufacturing method as claimed in claim 1, wherein a P-polarized light is used as the light including the predetermined wavelength.

15. A thermally-assisted magnetic recording head comprising:
a light source unit comprising: a unit substrate made of a material transmitting light having a predetermined wavelength; and a light source provided in a source-installation surface of the unit substrate; and
a slider comprising: a slider substrate made of a material having a lower thermal conductivity than a material of the unit substrate; a magnetic head element configured to write and/or read data and provided in an element-integration surface of the slider substrate; and an optical system configured to propagate a light from the light source toward a magnetic recording medium and provided in the element-integration surface,
the light source unit and the slider being bonded by a unit adhesion material layer melted and solidified with a light that includes the predetermined wavelength and has passed through the unit substrate, and
the unit adhesion material layer containing a material selected from a group consisting of tin, tin alloy, lead alloy and bismuth alloy.

16. The thermally-assisted magnetic recording head as claimed in claim 15, wherein the unit adhesion material layer contains a material selected from a group consisting of Sn, SnAu, SnCu, SnAl, SnSi, SnGe, SnMg, SnPb, SnAg, SnZn, SnBi, SnNi, SnPt, PbAu, PbMg, PbBi and BiAu.

17. The thermally-assisted magnetic recording head as claimed in claim 15, wherein the unit adhesion material layer is made of a material having a melting point lower than a melting point of a light-source adhesion material layer that joins the light source to an electrode provided on the unit substrate.

18. The thermally-assisted magnetic recording head as claimed in claim 17, wherein the unit adhesion material layer is made of a material having a melting point lower, by 30° C. or more, than a melting point of a light-source adhesion material layer that joins the light source to an electrode provided on the unit substrate.

19. The thermally-assisted magnetic recording head as claimed in claim 15, wherein a reflective layer is provided on a surface of the unit substrate and between the surface and the unit adhesion material layer, the reflective layer reflecting the light including the predetermined wavelength.

* * * * *